(12) United States Patent
Ueno et al.

(10) Patent No.: US 11,790,783 B2
(45) Date of Patent: Oct. 17, 2023

(54) PEDESTRIAN DEVICE, VEHICLE-MOUNTED DEVICE, MOBILE BODY GUIDANCE SYSTEM, AND MOBILE BODY GUIDANCE METHOD

(71) Applicant: Panasonic Corporation, Osaka (JP)

(72) Inventors: Tsuyoshi Ueno, Kanagawa (JP); Hiroaki Sudo, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 336 days.

(21) Appl. No.: 17/275,483

(22) PCT Filed: Sep. 6, 2019

(86) PCT No.: PCT/JP2019/035228
§ 371 (c)(1),
(2) Date: Mar. 11, 2021

(87) PCT Pub. No.: WO2020/054625
PCT Pub. Date: Mar. 19, 2020

(65) Prior Publication Data
US 2022/0020273 A1    Jan. 20, 2022

(30) Foreign Application Priority Data

Sep. 14, 2018  (JP) ................. 2018-172656

(51) Int. Cl.
*G08G 1/16*  (2006.01)
*G05D 1/02*  (2020.01)
(Continued)

(52) U.S. Cl.
CPC ........... *G08G 1/166* (2013.01); *G05D 1/0214* (2013.01); *G05D 1/0225* (2013.01); *G08G 1/005* (2013.01)

(58) Field of Classification Search
CPC ........ G08G 1/166; G08G 1/005; G08G 1/168; G08G 5/00; G08G 5/04; G05D 1/0214;
(Continued)

(56) References Cited

U.S. PATENT DOCUMENTS 8,140,209 B2   3/2012  Adachi et al.
9,557,741 B1 *  1/2017  Elie ................. G01B 11/22
(Continued)

FOREIGN PATENT DOCUMENTS

JP    2010-188897    9/2010
JP    2016-122308    7/2016
(Continued)

OTHER PUBLICATIONS

Official Communication issued in International Bureau of WIPO Patent Application No. PCT/JP2019/035228, dated Dec. 10, 2019, along with an English translation thereof.
(Continued)

*Primary Examiner* — Rodney A Butler
(74) *Attorney, Agent, or Firm* — GREENBLUM & BERNSTEIN, P.L.C.

(57) ABSTRACT

A system for guiding an autonomous vehicle to a target location includes a pedestrian terminal carried by a user of the vehicle; an in-vehicle terminal mounted in the vehicle; and a wearable terminal worn on the user's body to detect a sight focusing status of the user. The pedestrian terminal is configured to transmit and receive information to and from the in-vehicle terminal, determine if there is a risk of collision between the vehicle and the user, and provide an alert to the pedestrian. The in-vehicle terminal is configured to transmit and receive information to and from the pedestrian terminal, determine if there is a risk of collision between the vehicle and the user based on the information received from the pedestrian terminal, and cause an autono-
(Continued)

mous driving ECU to perform cruise control so as to avoid the collision.

14 Claims, 31 Drawing Sheets

(51) Int. Cl.
  *G08G 1/00* (2006.01)
  *G08G 1/005* (2006.01)
(58) Field of Classification Search
  CPC ............... G05D 1/0225; G05D 1/0212; G05D 2201/0213; G05D 1/0016
  See application file for complete search history.

(56) References Cited

U.S. PATENT DOCUMENTS

| | | | |
|---|---|---|---|
| 10,618,528 | B2 | 4/2020 | Sakai et al. |
| 2009/0118900 | A1 | 5/2009 | Adachi et al. |
| 2012/0078466 | A1* | 3/2012 | Natori .................... G08G 1/166 701/36 |
| 2020/0053526 | A1* | 2/2020 | Ujiie ...................... G08G 1/162 |
| 2020/0322595 | A1* | 10/2020 | Abe ..................... H04N 13/383 |

FOREIGN PATENT DOCUMENTS

| | | |
|---|---|---|
| JP | 2016-157281 | 9/2016 |
| JP | 2017-007399 | 1/2017 |
| WO | 2007/058325 | 5/2007 |
| WO | 2017/072956 | 5/2017 |
| WO | 2017/213070 | 12/2017 |

OTHER PUBLICATIONS

International Search Report issued in International Pat. Appl. No. PCT/JP2019/035228, dated Dec. 10, 2019, along with an English translation thereof.

* cited by examiner

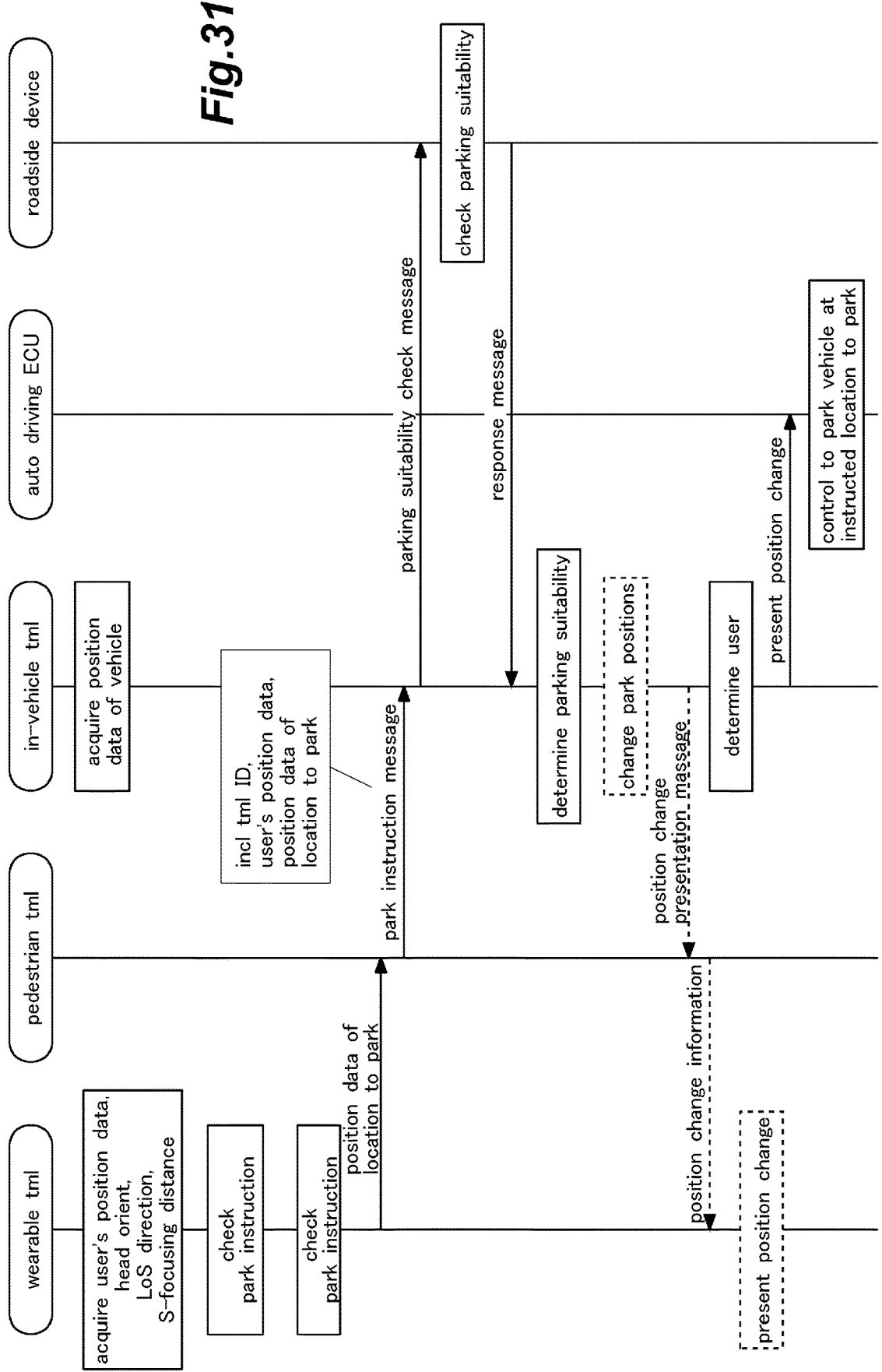

… a terminal device mounted in the mobile body, wherein the pedestrian device is configured to transmit and receive information to and from the terminal device, determine if there is a risk of collision between the mobile body and the pedestrian based on the information received from the terminal device, and when necessary, provide an alert to the pedestrian, wherein the terminal device is configured to transmit and receive information to and from the pedestrian device, determine if there is a risk of collision between the mobile body and the user based on the information received from the pedestrian device, and when necessary, causes a mobile controller to perform control so as to avoid the collision, wherein the method comprises: the pedestrian device acquiring position data of a sight focusing location at which the user looks with attention as position data of a target location; the pedestrian device transmitting the position data of the target location to the terminal device; and when receiving the position data of the target location from the pedestrian device, the terminal device causing the mobile controller to perform control so as to move the mobile body to the target location based on the position data of the target location.

Effect of the Invention

According to the present invention, a mobile body with autonomous movement capability can be guided to a proper location through line-of-sight-based guidance utilizing a line-of-sight of a user. In addition, the present invention can be implemented by using devices included in an existing safe driving assistance wireless system utilizing ITS, which minimizes costs for implementation.

BRIEF DESCRIPTION OF THE DRAWINGS

FIG. 31 is a sequence diagram showing an operation procedure of a line-of-sight-based guidance system according to the eighth embodiment.

DESCRIPTION OF THE PREFERRED EMBODIMENT(S)

Figure 1:
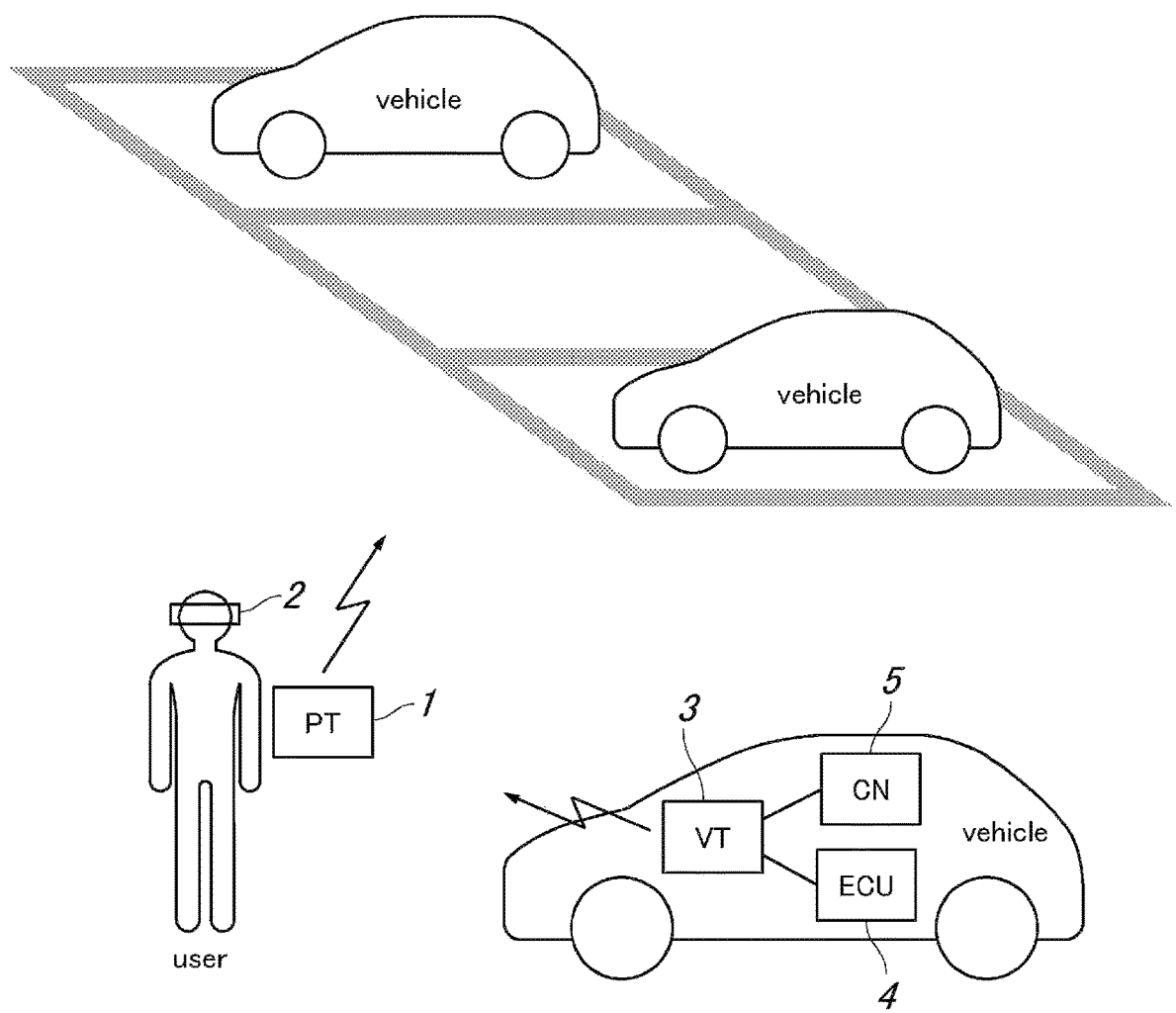
FIG. 1 is a diagram showing a general configuration of a mobile body guidance system according to a first embodiment of the present invention.

A first aspect of the present invention which has been made to achieve the above-described object is a pedestrian device carried by a pedestrian who is a user of a mobile body with autonomous movement capability, the device comprising: a communication device configured to transmit and receive information to and from a terminal device mounted in the mobile body; and a controller configured to determine if there is a risk of collision between the mobile body and the pedestrian based on the information received from the terminal device, and when necessary, perform control so as to provide an alert to the pedestrian, wherein the controller is configured to: acquire position data of a sight focusing location at which the user looks with attention, as position data of a target location; and cause the communication device to transmit the position data of the target location to the terminal device mounted in the mobile body used by the user, thereby causing the terminal device to perform control so as to move the mobile body to the target location.

According to this configuration, a mobile body with autonomous movement capability can be guided to a proper location through line-of-sight-based guidance utilizing a line-of-sight of a user. In addition, this configuration can be implemented by using devices included in an existing safe driving assistance wireless system utilizing ITS, which minimizes costs for implementation.

A second aspect of the present invention is the pedestrian device of the first aspect, further comprising a short-range communication device configured to perform short-range communications with a wearable device, wherein the wearable device is configured to be worn on the user's body and detect a sight focusing status of the user; and wherein the controller acquires the position data of the sight focusing location from the wearable device.

In this configuration, since the wearable device is used to detect the pedestrian's sight focusing status, the pedestrian device can acquire more accurate sight status information.

In this case, the wearable device may acquire sight focusing information on the sight focusing status of the user (such as head orientation data, line-of-sight direction data, and sight focusing distance data), and acquire position data of the sight focusing location based on the sight focusing information and the position data of the wearable device. Alternatively, the pedestrian device may be configured such that, upon receiving sight focusing information transmitted from the wearable device, the pedestrian device acquire position data of the sight focusing location based on the received sight focusing information.

A third aspect of the present invention is the pedestrian device of the first aspect, wherein the controller is configured to: acquire the position data of the sight focusing location as position data of a designated parking location; and cause the communication device to transmit the position data of the designated parking location to the terminal device mounted in the mobile body, the mobile body being an autonomous vehicle, thereby causing the terminal device to perform control so as to park the autonomous vehicle at the designated parking location.

This configuration enables the autonomous vehicle to be guided so as to park at a proper location (parking space) through line-of-sight-based guidance.

A fourth aspect of the present invention is the pedestrian device of the first aspect, wherein the controller is configured to: determine whether or not the user is riding in the mobile body; and when the user is riding in the mobile body, acquire position data of the mobile body transmitted from the terminal device as position data of the user.

This configuration can determine a location which can be seen from the inside of the mobile body as the target location, thereby allowing the mobile body to move to the target location. In addition, this configuration can utilize the position data of the mobile body, which is more accurate than the user's position data, thereby improving the accuracy of measurement of the position of the mobile body.

A fifth aspect of the present invention is the pedestrian device of the first aspect, wherein the controller is configured to: acquire 2D position data of the target location based on 3D measurement data of a sight focusing point at which the user looks with attention; and cause the communication device to transmit the 2D position data of the target location to the terminal device, thereby causing the terminal device to perform control so as to move the mobile body to the target location.

This configuration enables a user to look at a target object located in the distance, thereby moving the mobile body to the location of the target object. In this configuration, the wearable device can acquire the 3D measurement data (sight focusing orientation, elevation angle, and distance) from the user's sight focusing status information, and the pedestrian device may acquire the 2D position data (longitude and latitude) of the target location from the 3D measurement data.

A sixth aspect of the present invention is the pedestrian device of the first aspect, wherein the communication device is configured to communicate with a different pedestrian device, and wherein the controller is configured to: receive position data of a target location transmitted from the different pedestrian device; when the target location from the different pedestrian device matches the target location of the pedestrian device, determine whether or not the pedestrian device has a lower priority than the different pedestrian device; and when the priority of the pedestrian device is lower than that of the different pedestrian device, perform control so as to guide the user to change the target location.

This configuration can eliminate the problem that, when two or more users guide their mobile bodies to the same target location approximately at the same time, the users are unable to move the mobile bodies to the target location.

A seventh aspect of the present invention is the pedestrian device of the first aspect, wherein the controller is configured to: acquire 3D position data of a sight focusing point at which the user looks with attention, as 3D position data of a target point; and cause the communication device to transmit the 3D position data of the target point to the terminal device mounted in the mobile body which has autonomous flight capability, thereby causing the terminal device to perform control so as to move the mobile body to the target point.

This configuration can guide a mobile body which has autonomous flight capability to a proper location through line-of-sight-based guidance. That is, a user can look at a focusing point in the space, thereby moving the mobile body to that focusing point.

An eighth aspect of the present invention is the pedestrian device of the third aspect, wherein, when the terminal device finds no parking space at which the vehicle can park in the designated parking location, the terminal device selects a new designated parking location and transmits a location change notification regarding the new designated paring location to the pedestrian device, and wherein, when the pedestrian device receives the location change notification from the terminal device, the controller presents the new designated parking location to the user.

In this configuration, a user can confirm that the parking location designated by the user has been changed to another location.

A ninth aspect of the present invention is the pedestrian device of the eighth aspect, wherein, when the controller presents the new designated parking location to the user and the user takes an action in response, the controller acquires, based on the action taken by the user, information on the user's indication of approval or selection regarding the new designated parking location.

This configuration can notify the terminal device of the user's indication of approval or selection regarding the new designated parking location.

A tenth aspect of the present invention is an in-vehicle device mounted in a vehicle with autonomous movement capability, the device comprising: a communication device configured to transmit and receive information to and from a pedestrian device carried by a user; and a controller configured to determine if there is a risk of collision between the vehicle and the user based on the information received from the pedestrian device, and when necessary, causes a cruise controller to perform cruise control so as to avoid the collision, wherein, when the in-vehicle device receives position data of a sight focusing location at which the user looks with attention as position data of a target location transmitted from the pedestrian device, the controller causes the cruise controller to perform control so as to move the vehicle to the target location based on the position data of the target location.

In this configuration, a mobile body with autonomous movement capability can be guided to a proper location through line-of-sight-based guidance utilizing a line-of-sight of a user. In addition, this configuration can be implemented by using devices included in an existing safe driving assistance wireless system utilizing ITS, which minimizes costs for implementation.

An eleventh aspect of the present invention is the in-vehicle device of the tenth aspect, wherein, when the in-vehicle device receives position data of a designated parking location which is the target location, the controller performs control so as to park the vehicle at the designated parking location based on the position data of the designated parking location.

This configuration enables the autonomous vehicle to be guided so as to park at a proper location (parking space) through line-of-sight-based guidance.

A twelfth aspect of the present invention is the in-vehicle device of the tenth aspect, further comprising a storage for storing integrated map information, wherein, based on parking suitability information included in the integrated map information, the controller determines whether or not a designated parking location which is the target location, is a parking space at which the vehicle can park.

In this configuration, a user can confirm beforehand whether or not the vehicle can park at a designated parking location. In addition, since parking suitability information is registered and included in the integrated map information (dynamic map) used in the autonomous driving of the vehicle, the management of the information becomes easier.

A thirteenth aspect of the present invention is the in-vehicle device of the eleventh aspect, wherein the communication device communicates with a roadside device, the roadside device being provided with an object detector configured to detect a mobile body on a road, and wherein, based on parking suitability information received from the roadside device, the controller determines whether or not the vehicle can park at the designated parking location.

In this configuration, the in-vehicle device can acquire parking suitability information on a real-time basis, thereby enabling more accurate determination of whether or not the vehicle can park at the designated parking location.

A fourteenth aspect of the present invention is the in-vehicle device of the eleventh aspect, wherein, when there are two or more parking spaces which correspond to the designated parking location and at which the vehicle can park, the controller determines one of the parking spaces as a designated parking location, based on a predetermined selection criterion.

In this configuration, even when there are two or more parking spaces which correspond to the designated parking location designed by the user, the vehicle can be parked at a proper parking space.

A fifteenth aspect of the present invention is the in-vehicle device of the eleventh aspect, wherein, when there is no parking space which corresponds to the designated parking location and at which the vehicle can park, the controller determines one parking space at which the vehicle can park as a designated parking location, based on a predetermined selection criterion.

In this configuration, even when a positioning error occurs, the vehicle can be parked at a proper parking space.

A sixteenth aspect of the present invention is the in-vehicle device of the eleventh aspect, wherein, when there is no parking space which corresponds to the designated parking location and at which the vehicle can park, the controller selects one parking space at which the vehicle can park as a new designated parking location, based on a predetermined selection criterion, and transmits a location change notification regarding the new designated parking location to the pedestrian device.

In this configuration, a user can confirm that the parking location designated by the user has been changed to another location.

A seventeenth aspect of the present invention is a mobile body guidance system for guiding a mobile body with autonomous movement capability in response to an action taken by a user, the system comprising: a pedestrian device carried by a pedestrian who is the user of the mobile body; and a terminal device mounted in the mobile body, wherein the pedestrian device comprises: a communication device configured to transmit and receive information to and from the terminal device; and a controller configured to determine if there is a risk of collision between the mobile body and the pedestrian based on the information received from the terminal device, and when necessary, perform control so as to provide an alert to the pedestrian, wherein the controller of the pedestrian device is configured to: acquire position data of a sight focusing location at which the user looks with attention, as position data of a target location; and cause the communication device of the pedestrian device to transmit the position data of the target location to the terminal device mounted in the mobile body used by the user, wherein the terminal device comprises: a communication device configured to transmit and receive information to and from the pedestrian device; and a controller configured to determine if there is a risk of collision between the mobile body and the user based on the information received from the pedestrian device, thereby causing a mobile controller to perform cruise control so as to avoid the collision, wherein, when receiving the position data of the target location from the pedestrian device, the controller of the terminal device causes the mobile controller to perform control so as to move the mobile body to the target location based on the position data of the target location.

In this configuration, a mobile body with autonomous movement capability can be guided to a proper location through line-of-sight-based guidance utilizing a line-of-sight of a user, in the same manner as the first aspect. In addition, this configuration can be implemented by using devices included in an existing safe driving assistance wireless system utilizing ITS, which minimizes costs for implementation.

An eighteenth aspect of the present invention is a mobile body guidance method for guiding a mobile body with autonomous movement capability in response to an action taken by a user, wherein a pedestrian device is carried by a pedestrian who is the user of the mobile body, wherein a terminal device mounted in the mobile body, wherein the pedestrian device is configured to transmit and receive information to and from the terminal device, determine if there is a risk of collision between the mobile body and the pedestrian based on the information received from the terminal device, and when necessary, provide an alert to the pedestrian, wherein the terminal device is configured to transmit and receive information to and from the pedestrian device, determine if there is a risk of collision between the mobile body and the user based on the information received from the pedestrian device, and when necessary, causes a mobile controller to perform control so as to avoid the collision, wherein the method comprises: the pedestrian device acquiring position data of a sight focusing location at which the user looks with attention as position data of a target location; the pedestrian device transmitting the position data of the target location to the terminal device; and when receiving the position data of the target location from the pedestrian device, the terminal device causing the mobile controller to perform control so as to move the mobile body to the target location based on the position data of the target location.

In this configuration, a mobile body with autonomous movement capability can be guided to a proper location through line-of-sight-based guidance utilizing a line-of-sight of a user, in the same manner as the first aspect. In addition, this configuration can be implemented by using devices included in an existing safe driving assistance wireless system utilizing ITS, which minimizes costs for implementation.

Embodiments of the present invention will be described below with reference to the drawings.

First Embodiment

FIG. 1 is a diagram showing a general configuration of a mobile body guidance system according to a first embodiment of the present invention.

The mobile body guidance system is used by a user to guide a mobile body with autonomous movement capability such as a vehicle (autonomous driving vehicle) to a proper target location. The system includes a pedestrian terminal 1 (pedestrian device), a wearable terminal 2, an in-vehicle terminal 3 (in-vehicle device), an autonomous driving ECU 4 (mobile controller, cruise controller), and a car navigation device 5.

The pedestrian terminal 1 and the in-vehicle terminal 3 perform ITS communications (pedestrian-to-vehicle communications) with each other. ITS communications are performed using frequency bands adopted by ITS-based (i.e., using Intelligent Transport System) safe driving assistance wireless systems (for example, 700 MHz band, 5.8 GHz band, or 5.8 GHz band).

The pedestrian terminal 1 is configured to be carried by a pedestrian. The pedestrian terminal 1 transmits and receives messages including position data to and from the in-vehicle terminal 3 through ITS communications (pedestrian-to-vehicle communication), and determines if there is a risk of collision between the pedestrian and the vehicle.

The wearable terminal 2 is configured to be worn by a pedestrian. The wearable terminal 2 is connected to the pedestrian terminal 1, and when there is a risk of collision, the wearable terminal 2 provides, based on the control of the pedestrian terminal 1, an alert to the pedestrian by using vibration, voice, or image display. In the present embodiment, the wearable terminal 2 is worn on the user's head and configured to detect the user's head orientation (face direction) and line-of-sight direction.

The in-vehicle terminal 3 is configured to be mounted in a vehicle. The in-vehicle terminal 3 transmits and receives messages including position data to and from the pedestrian terminal 1 through ITS communications (pedestrian-to-vehicle communication), and determines if there is a risk of collision between the pedestrian and the vehicle.

The autonomous driving ECU 4 is mounted in a vehicle. The autonomous driving ECU 4 performs automatic driving (autonomous driving) of the vehicle based on control information provided from the in-vehicle terminal 3.

The car navigation device 5 is mounted in a vehicle. The car navigation device 5 provides route guidance to the autonomous driving ECU 4.

In the present embodiment, a user guides a vehicle to a proper location through line-of-sight-based guidance utilizing a line-of-sight of the user. In particular, in the present embodiment, a user outside the vehicle looks at a parking space, thereby moving the vehicle to the parking space to park there. That is, the wearable terminal 2 detects the user's head orientation (face orientation) and line-of-sight direction, and the pedestrian terminal 1 transmits the position data (latitude, longitude) of the location at which the user looks with attention (sight focusing location), to the in-vehicle terminal 3 through pedestrian-to-vehicle communication. Then, the autonomous driving ECU 4 performs control so as to park the vehicle at the parking space.

Although, in the present embodiment, a user outside the vehicle guides the vehicle to a parking space to park there, the system may be configured such that a user can guide the vehicle to any location other than parking spaces. For example, a user who comes out of the store can cause a parked vehicle to come to in front of the user. In this case, what the user has to do is only to look at the ground in front of the user.

Figure 2:
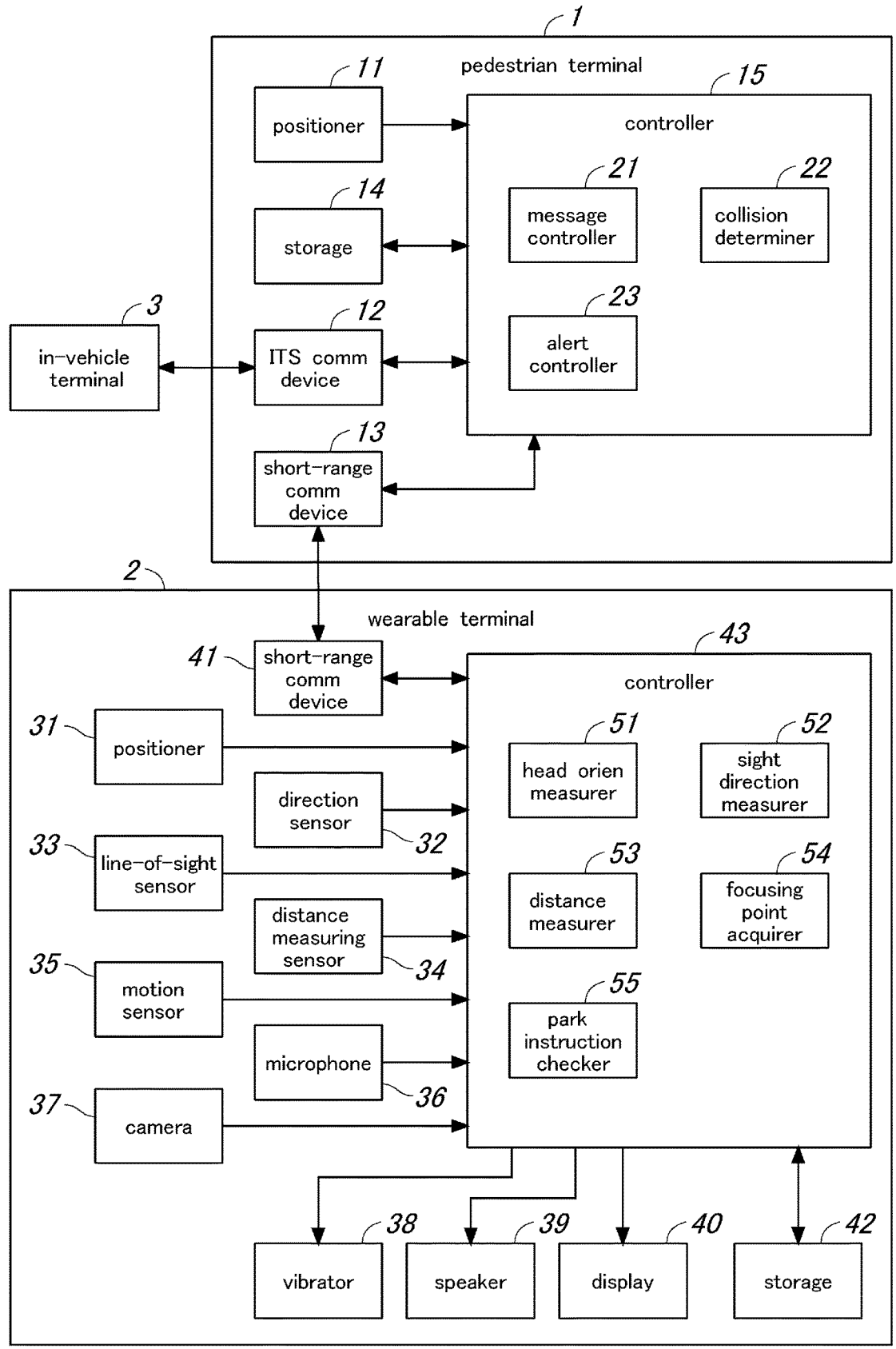
FIG. 2 is a block diagram showing a schematic configuration of a pedestrian terminal 1 and a wearable terminal 2 according to the first embodiment.

Next, a schematic configuration of a pedestrian terminal 1 and a wearable terminal 2 according to the first embodiment will be described. FIG. 2 is a block diagram showing a schematic configuration of a pedestrian terminal 1 and a wearable terminal 2.

The pedestrian terminal 1 includes a positioner 11, an ITS communication device 12 (pedestrian-to-vehicle communication device), a short-range communication device 13, a storage 14, and a controller 15.

The positioner 11 measures the position of the pedestrian terminal by using a satellite positioning system such as GPS (Global Positioning System) or QZSS (Quasi-Zenith Satellite System), to thereby acquire the position data (latitude, longitude) of the pedestrian terminal 1.

The ITS communication device 12 transmits and receives messages to and from the in-vehicle terminal 3 through ITS communications (pedestrian-to-vehicle communications).

The short-range communication device 13 performs short-range communications, such as communications using Bluetooth (registered trademark), with the wearable terminal 2.

The storage 14 stores the terminal ID of the pedestrian terminal 1, programs executable by a processor which implements the controller 15, and other information.

The controller 15 includes a message controller 21, a collision determiner 22, and an alert controller 23. The controller 15 is configured by the processor, and each unit of the controller 15 is implemented by the processor executing a program stored in the storage 14.

The message controller 21 controls the transmission of messages to the in-vehicle terminal 3.

The collision determiner 22 determines if there is a risk of collision between the vehicle and the pedestrian based on the position data of the pedestrian acquired by the positioner 11 and that of the vehicle included in a message received from the in-vehicle terminal 3.

The alert controller 23 controls the wearable terminal 2 so as to perform an alert operation, providing a predetermined alert to the pedestrian. In the present embodiment, when the collision determiner 22 determines that there is a risk of collision, the alert controller 23 causes a wearable terminal 2 to perform an alert operation.

The wearable terminal 2 includes a positioner 31, a direction sensor 32, a line-of-sight sensor 33, a distance measuring sensor 34, a motion sensor 35, a microphone 36, a camera 37, a vibrator 38, a speaker 39, a display 40, a short-range communication device 41, a storage 42, and a controller 43.

The positioner 31 measures the position of the pedestrian terminal by using a satellite positioning system such as GPS or QZSS, to thereby acquire the position data (latitude, longitude) of the wearable terminal 2.

The direction sensor 32 detects the geomagnetic direction. From the detection result of the direction sensor 32, the wearable terminal 2 can acquire the head orientation (face orientation) of a user who wears the wearable terminal 2.

The line-of-sight sensor 33 detects the line of sight of a user. From the detection result of the line-of-sight sensor 33, the wearable terminal 2 can acquire the coordinates of the user's viewpoint within the line-of-sight detection area defined in the XY orthogonal coordinate system.

The distance measuring sensor 34 measures the distance to an opposite object. The distance measuring sensor 34 may adopt, for example, a PSD (Position Sensitive Detector) type configuration. In the PSD configuration, a light emitting element emits light, which is reflected by an object, and a light receiving element detects the reflected light, and then the distance measuring sensor 34 measures the distance to the object based on the angle of incidence of the reflected light, which changes with the distance to the object.

The motion sensor 35 is composed primarily of an acceleration sensor or a gyro sensor, and detects the movement of a user's head. The microphone 36 picks up a user's voice. The camera 37 captures a user's face, especially the user's mouth. The motion sensor 35, the microphone 36, and the camera 37 are used to detect an action which a user takes to indicate approval.

The vibrator 38 provides vibration. The speaker 39 outputs sound. The display 40 displays an image. The vibrator 38, the speaker 39, and the display 40 perform, based on the control of the pedestrian terminal 1, an alert operation to urge the pedestrian to pay attention to an approaching vehicle.

The short-range communication device 41 performs short-range communications, such as communications using Bluetooth (registered trademark), with the pedestrian terminal 1.

The storage 42 stores programs executable by the processor which implements the controller 43, and other information.

The controller 43 includes a head orientation measurer 51, a sight direction measurer 52, a distance measurer 53, a focusing point acquirer 54, and a park instruction checker 55. The controller 43 is configured by the processor, and each unit of the controller 43 is implemented by the processor executing a program stored in the storage 42.

The head orientation measurer 51 measures the head orientation (face orientation) of a user based on the detection result of the direction sensor 32.

The sight direction measurer 52 measures a user's line-of-sight direction (coordinates of sight focusing point) based on detection results of the line-of-sight sensor 33. The line-of-sight sensor 33 is composed primarily of a camera for capturing images of the user's eyes, and is configured to analyze the captured images to thereby acquire the angles of the user's left and right eyes.

Based on the respective detection results of the line-of-sight sensor 52 and the distance measuring sensor 34, the distance measurer 53 measures (determines) the distance (sight focusing distance) from the viewpoint of a user to an object (target object) at which the pedestrian looks with attention.

The focusing point acquirer 54 acquires position data (latitude, longitude) of a point (sight focusing point) at which the user looks based on the head orientation acquired by the head orientation measurer 51, the line-of-sight direction acquired by the sight direction measurer 52, and the sight focusing distance acquired by the distance measurer 53.

The park instruction checker 55 presents the sight focusing location to a user as a designated parking location (location to park), and when detecting the user's action (instruction action) for instructing the vehicle to park at the designated parking location, the park instruction checker 55 determines that the user has instructed to park at the designated parking location (sight focusing location).

In the present embodiment, examples of detection of instruction actions for instructing the vehicle to park at a designated parking location (instruction actions) are as follows:

the motion sensor 35 detects the movement of a user's head, and based on the detection result, the park instruction checker 55 detects the user's nodding motion as an instruction action;

the microphone 36 picks up the user's voice, and the park instruction checker 55 detects a phrase spoken by the user indicating the user's approval such as "start" or "execution" as an instruction action; and the camera 37 captures images of the user's mouth, and the park instruction checker 55 detects the movement of the user's mouth, and based on the detection result, the park instruction checker 55 detects that the user's speaks a phrase indicating the user's approval such as "start" or "execution" as an instruction action.

Although, in the present embodiment, the wearable terminal 2 performs operations to acquire a sight focusing location and check for instructions to park the vehicle at a certain location, the system may be configured such that the pedestrian terminal 1 performs these operations. In this case, the pedestrian terminal 1 may be configured, for example, to detect a user's touch operation on a touch panel display (not shown) of the pedestrian terminal 1 (such as tapping an execution button) as an action for instructing to park at a designated parking location.

Figure 3:
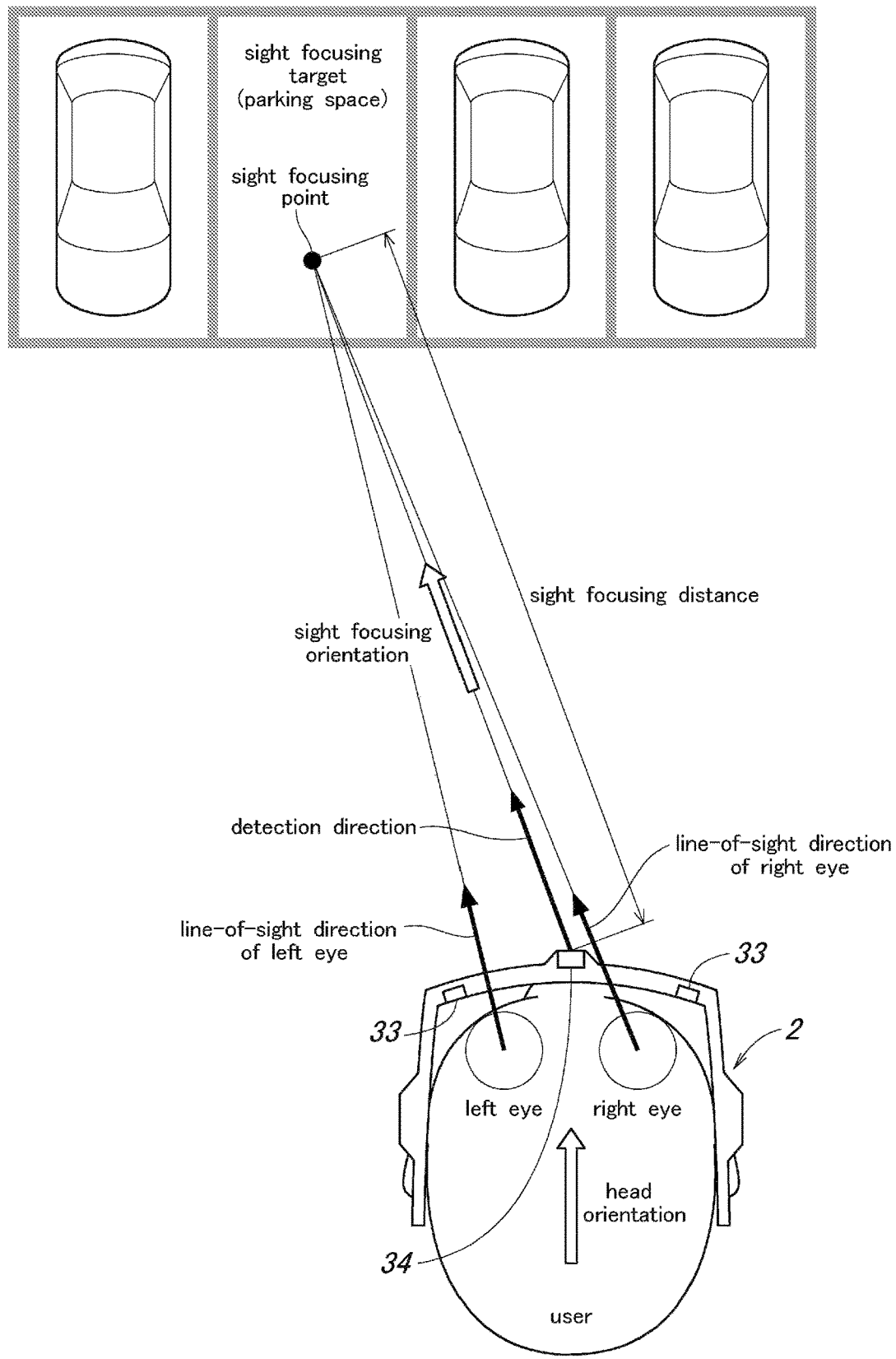
FIG. 3 is an explanatory diagram showing an outline of operations performed by the wearable terminal 2 according to the first embodiment.

Next, an outline of operations performed by the wearable terminal 2 according to the first embodiment will be described. FIG. 3 is an explanatory diagram showing an outline of operations performed by the wearable terminal 2.

The wearable terminal 2 includes the line-of-sight sensor 33, and the distance measuring sensor 34. The controller 43 of the wearable terminal 2 includes the head orientation measurer 51, the sight direction measurer 52, the distance measurer 53, and the focusing point acquirer 54 (See FIG. 2).

The head orientation measurer 51 measures the head orientation (face orientation) of a user based on the detection result of the direction sensor 32.

The line-of-sight direction measurer 52 measures a user's line-of-sight direction (the coordinates of the user's viewpoint) based on the detection result of the line-of-sight sensor 33. The line-of-sight sensor 33 sensor measures the respective directions of the line of sight from the user's right eye and the left eye (the directions of the left and right eyeballs), which differ from each other. Thus, the wearable terminal 2 may be configured to acquire a sight focusing point at which the lines of sight of the right and left eyes intersect, based on the directions of the line-of-sight from the right eye and the left eye and the distance between the right eye and the left eye, and determines the direction towards the sight focusing point as the user's line-of-sight direction.

The distance measurer 53 measures the distance (sight focusing distance) from the viewpoint of a user to the object (target object) at which the user looks, based on the measurement result of the line-of-sight sensor 52 and the detection result of the distance measuring sensor 34.

In the present embodiment, the distance measuring sensor 34, whose detection direction is adjustable, can be used such that, after the detection direction is adjusted to be in line with the line-of-sight direction of the user based on the detection result of the line-of-sight sensor 33, the distance measuring sensor 34 detects the distance to the opposite object to thereby measure the distance (sight focusing distance) to the object (the ground of a parking space) at which the pedestrian looks.

In the present embodiment, the distance measurer 53 measures the sight focusing distance by turning the detection direction of the distance measuring sensor 34 to the line-of-sight direction of the pedestrian based on the detection result of the line-of-sight sensor 33. However, the distance measurer 53 may be configured to measure the sight focusing distance based only on the detection result of the line-of-sight sensor 33 without using the distance measuring sensor 34. In this case, the sight focusing distance can be estimated based on the fact that the longer the sight focusing distance is, the smaller the angle of convergence of the lines of sight of the right and left eyes, and that the shorter the sight focusing distance is, the greater the angle of convergence of the lines of sight of the right and left eyes.

The focusing point acquirer 54 acquires the position data (latitude, longitude) of a location (sight focusing location) at which the user looks based on the head orientation acquired by the head orientation measurer 51, the line-of-sight direction acquired by the sight direction measurer 52, and the sight focusing distance acquired by the distance measurer 53. Specifically, the focusing point acquirer 54 calculates the orientation toward the point at which the user looks (sight focusing orientation) based on the user's head orientation and line-of-sight direction; that is, the focusing point acquirer 54 determines the direction of line-of-sight with reference to the head orientation as a sight focusing orientation, and then determines the position data (latitude, longitude) of a sight focusing location based on the user's position and the user's sight focusing orientation and sight focusing distance.

Figure 4:
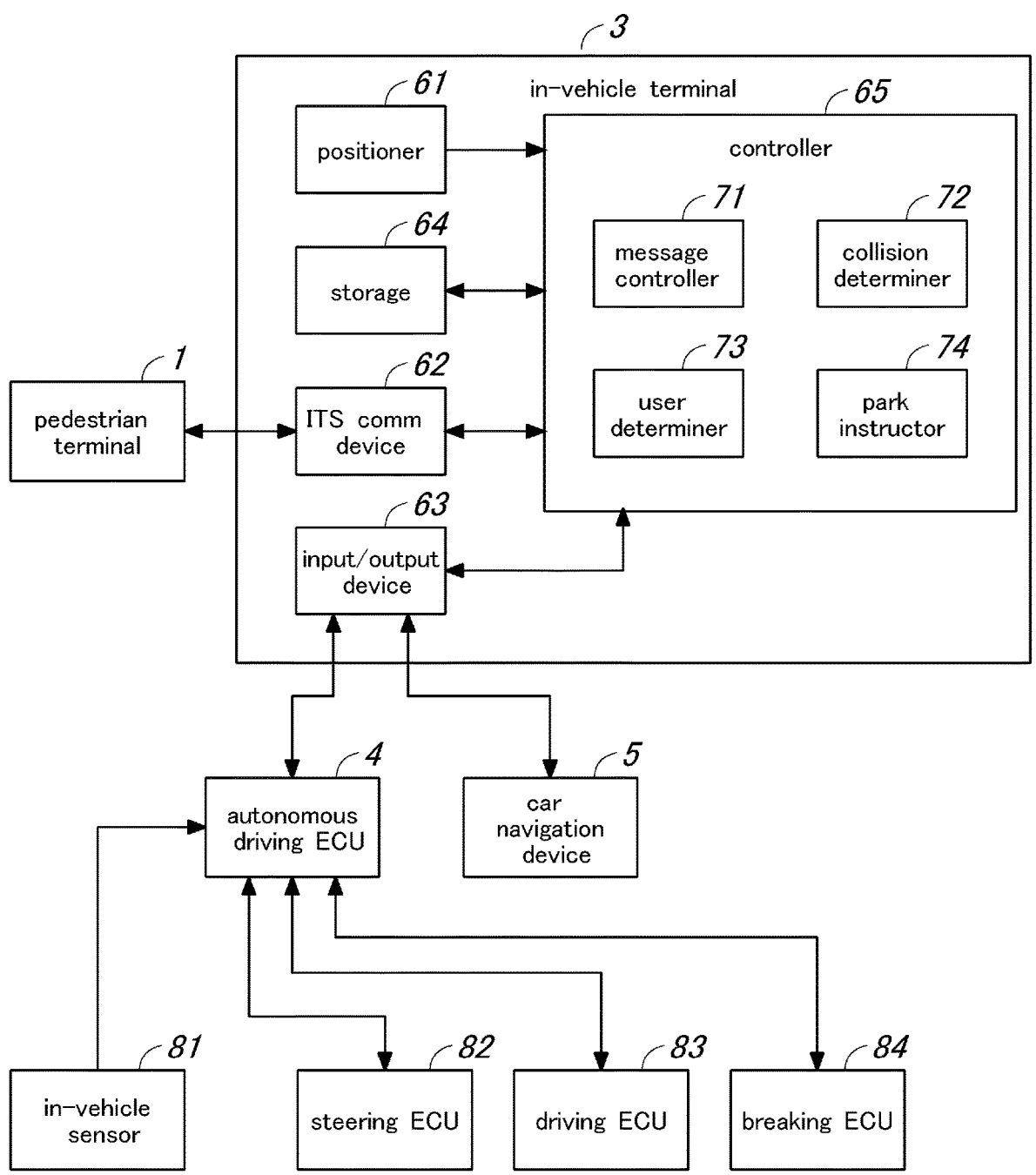
FIG. 4 is a block diagram showing a schematic configuration of an in-vehicle terminal 3 according to the first embodiment.

Next, a schematic configuration of an in-vehicle terminal 3 according to the first embodiment will be described. FIG. 4 is a block diagram showing a schematic configuration of an in-vehicle terminal 3.

The in-vehicle terminal 3 includes a positioner 61, an ITS communication device 62 (pedestrian-to-vehicle communication device), an input/output device 63, a storage 64, and a controller 65.

The positioner 61 measures the position of the pedestrian terminal itself by using a satellite positioning system such as GPS or QZSS, to thereby acquire the in-vehicle terminal's position data (latitude, longitude).

The ITS communication device 62 transmits and receives messages to and from the pedestrian terminal 1 through ITS communications (pedestrian-to-vehicle communications).

The input/output device 63 receives and provides information from and to the autonomous driving ECU 4 and the car navigation device 5.

The storage 64 stores user registration information for a user who uses the vehicle (such as the owner of the vehicle). The user registration information includes a terminal ID of the pedestrian terminal 1 carried by the user, which ID is registered beforehand when the vehicle is used. The storage 64 also stores programs executable by a processor which implements the controller 65, and other information.

The controller 65 includes a message controller 71, a collision determiner 72, a user determiner 73, and a park instructor 74. The controller 65 is configured by the processor, and each unit of the controller 65 is implemented by the processor executing a program stored in the storage 64.

The message controller 71 controls the transmission of messages to the pedestrian terminal 1.

The collision determiner 72 determines whether or not there is a risk of the vehicle colliding with a pedestrian, based on the position data of the vehicle acquired by the positioner 61 and the pedestrian's position data included in a message received from the pedestrian terminal 1. The collision determiner 72 is configured to output the determination result to the autonomous driving ECU 4, and when determining that there is a risk of colliding with a pedestrian, the autonomous driving ECU 4 performs control so as to avoid the collision.

The user determiner 73 determines whether or not a user instructing the vehicle to park is an authorized user, who is allowed to use the vehicle. Specifically, the user determiner 73 determines whether or not the terminal ID of the pedestrian terminal 1 included in a park instruction message provided from the pedestrian terminal 1 matches that of the pedestrian terminal 1 carried by the registered user.

When the user determiner 73 determines that the user instructing the vehicle to park is an authorized user, the park instructor 74 provides control information for parking the vehicle at a designated parking location to the autonomous driving ECU 4, based on the position data of the designated parking location included in the message received from the pedestrian terminal 1.

The autonomous driving ECU 4 is connected to an in-vehicle sensor 81, a steering ECU 82, a driving ECU 83, and a braking ECU 84. Based on the detection result of the in-vehicle sensor 81, the autonomous driving ECU 4 controls the steering ECU 82, the driving CU 83, and the braking ECU 84 to implement automatic driving (autonomous driving) of the vehicle.

The in-vehicle sensor 81 includes a LIDAR (Light Detection and Ranging), a steering angle sensor, and a speed sensor. The steering ECU 82 controls the steering mechanism of the vehicle, while the driving ECU 83 controls the driving mechanism (such as engine, electric motor) of the vehicle, and the braking ECU 84 controls the braking mechanism of the vehicle.

The types of automatic driving include autonomous driving which does not require a driver and driving assistance which assists a driver to drive the vehicle, and the system may be configured to operate in either of the switchable operation modes, i.e., the autonomous driving mode and the driving assistance mode. In the case of the driving assistance mode, when there is a risk of collision, the system needs to provide an alert to the driver. For example, the car navigation device 5 may provide an alert to the driver by using voice or image display, based on the control of the in-vehicle terminal 3.

Figure 5:
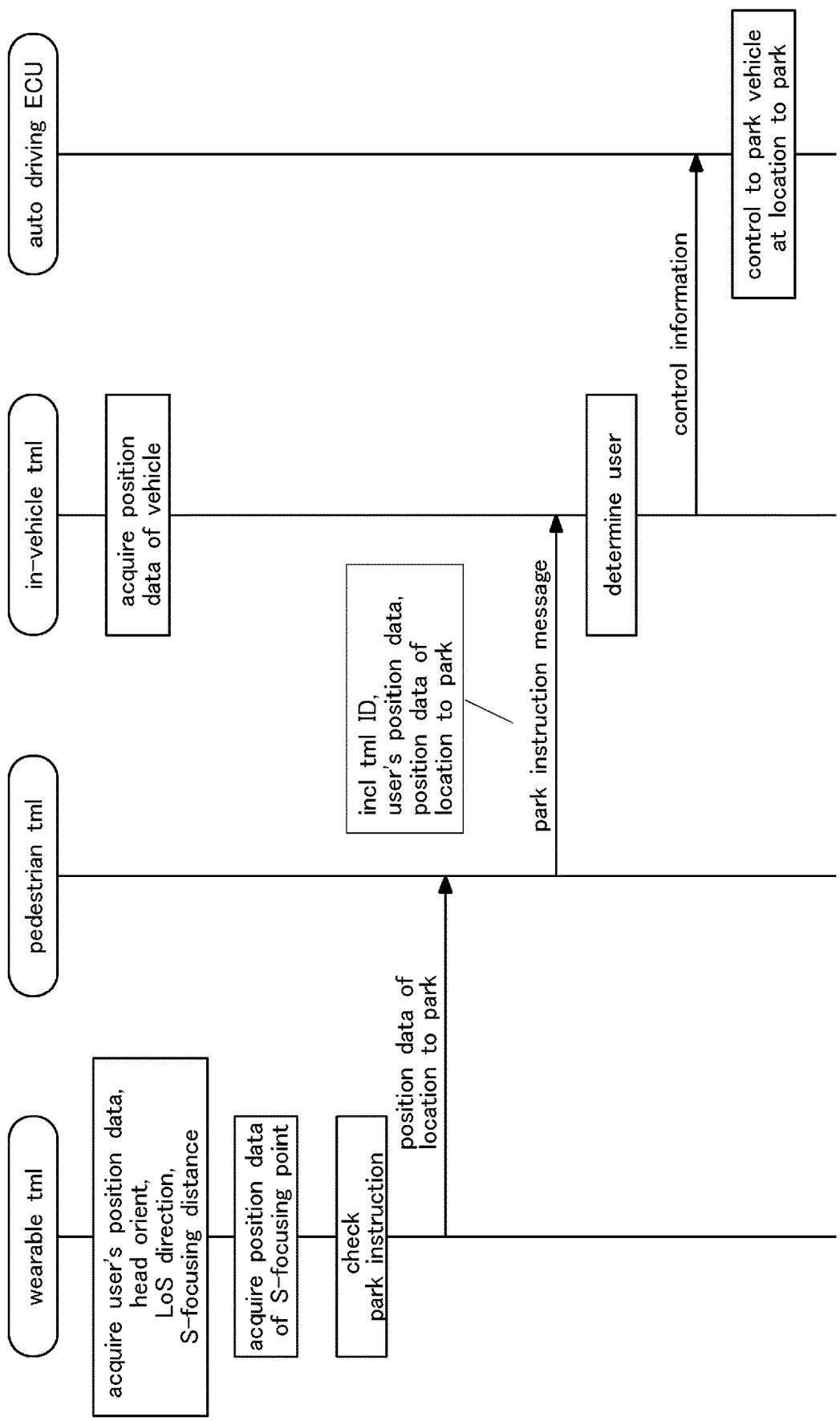
FIG. 5 is a sequence diagram showing an outline of an operation procedure of the mobile body guidance system according to the first embodiment.

Next, an operation procedure of the mobile body guidance system according to the first embodiment will be described. FIG. 5 is a sequence diagram showing an outline of an operation procedure of the mobile body guidance system. In the operation procedure, operations for collision detection and alert provision are omitted for clarification.

In the wearable terminal 2, the positioner 31 acquires position data of a user, and the head orientation measurer 51 acquires the user's head orientation. Furthermore, the sight direction measurer 52 acquires the user's line-of-sight direction, and the distance measurer 53 acquires the sight focusing distance of the user. Then, the focusing point acquirer 54 acquires the position data of the sight focusing location at which the user looks, based on the user's position data, the head orientation, the line-of-sight direction, and the sight focusing distance.

Next, in the wearable terminal 2, the park instruction checker 55 presents the sight focusing location to the user, in order to urge the user to indicate whether or not the user approves the sight focusing location as a designated parking location. Then, when detecting a user's action (instruction action) indicating the user's approval for determination of the designated parking location, the park instruction checker 55 determines that the user has instructed to park at the designated parking location (sight focusing location). Then, the short-range communication device 41 of the wearable terminal 2 transmits the position data of the designated parking location (the position data of the sight focusing location) to the pedestrian terminal 1.

In the pedestrian terminal 1, when the short-range communication device 13 receives the position data of the designated parking location from the wearable terminal 2, the message controller 21 generates a park instruction message, and then the ITS communication device 12 transmits the park instruction message to the in-vehicle terminal 3. The park instruction message includes the terminal ID of the pedestrian terminal 1 which is the source of message, the user's position data (latitude, longitude) and head orientation data, and the position data (latitude, longitude) of the designated parking location.

In the in-vehicle terminal 3, the positioner 61 acquires the position data of the vehicle, and when the ITS communication device 62 receives the park instruction message from the pedestrian terminal 1, the user determiner 73 determines whether or not the user instructing the vehicle to park is an authorized user, who is allowed to use the vehicle.

Next, the in-vehicle terminal 3, when the user determiner 73 determines that the user instructing the vehicle to park is an authorized user, the park instructor 74 provides control information to the autonomous driving ECU 4 to park the vehicle at the designated parking location. The control information includes the position data of the designated parking location and the position data of the vehicle.

Based on the control information provided from the in-vehicle terminal 3, the autonomous driving ECU 4 controls the steering ECU 82, the driving ECU 83, and the braking ECU 84 so as to park the vehicle at a parking space which is the designated parking location.

Second Embodiment

Figure 6:
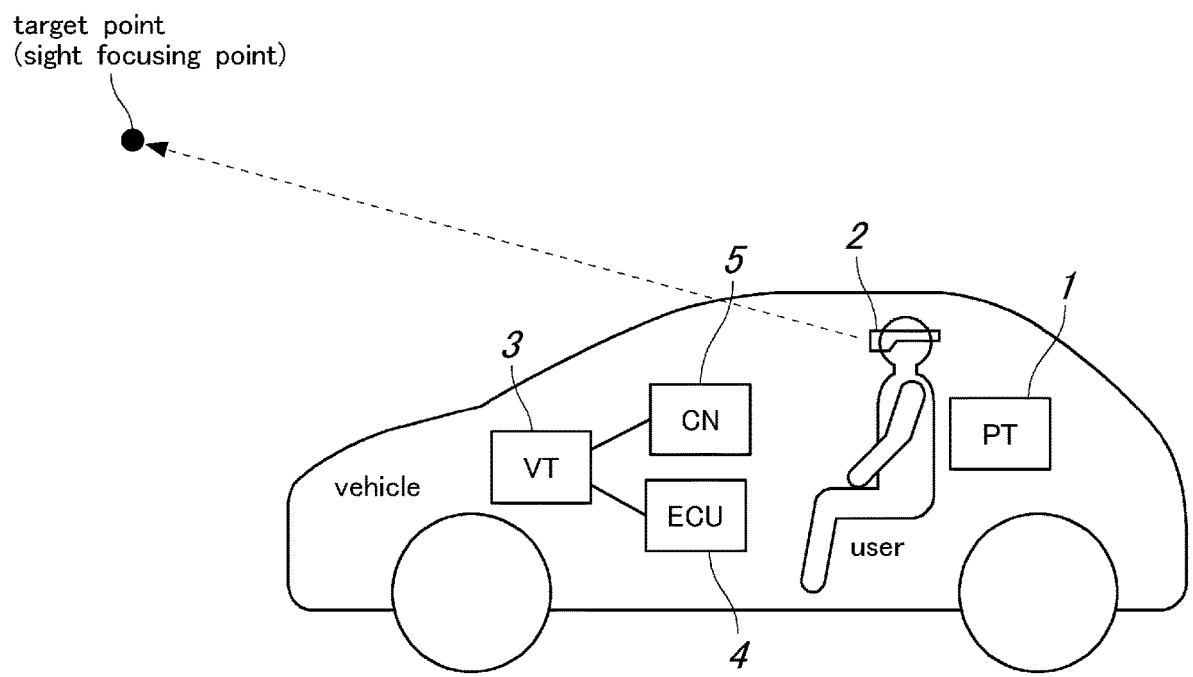
FIG. 6 is a diagram showing a general configuration of a mobile body guidance system according to a second embodiment of the present invention.

Next, a second embodiment of the present invention will be described. Except for what will be discussed here, the second embodiment is the same as the above-described first embodiment. FIG. 6 is a diagram showing a general configuration of a mobile body guidance system according to the second embodiment.

In the first embodiment, the system is configured such that a user outside the vehicle guides the vehicle to a parking space through line-of-sight-based guidance. In the present embodiment, in particular, even when a user is in the vehicle; that is, the user is riding in the vehicle (autonomous driving vehicle), the user can use the user's line-of-sight to designate the target object which can be seen from inside the vehicle, so as to guide the vehicle to the target object. For example, when a nearby store such as a convenience store can be seen from inside the vehicle, the user can move the vehicle to that store by looking at the store. In other cases, the user can keep looking at a vehicle traveling ahead to thereby control the vehicle to follow the vehicle traveling ahead of the user. Alternatively, the user can keep looking at a road ahead of the vehicle to thereby control the vehicle to travel along the road.

In the present embodiment, the system performs different controls depending on whether a user is inside or outside the vehicle. When a user outside the vehicle attempts to guide the vehicle to a certain location through line-of-sight-based guidance, the system may control the vehicle such that the vehicle starts to move after the user gets on the vehicle.

Figure 7:
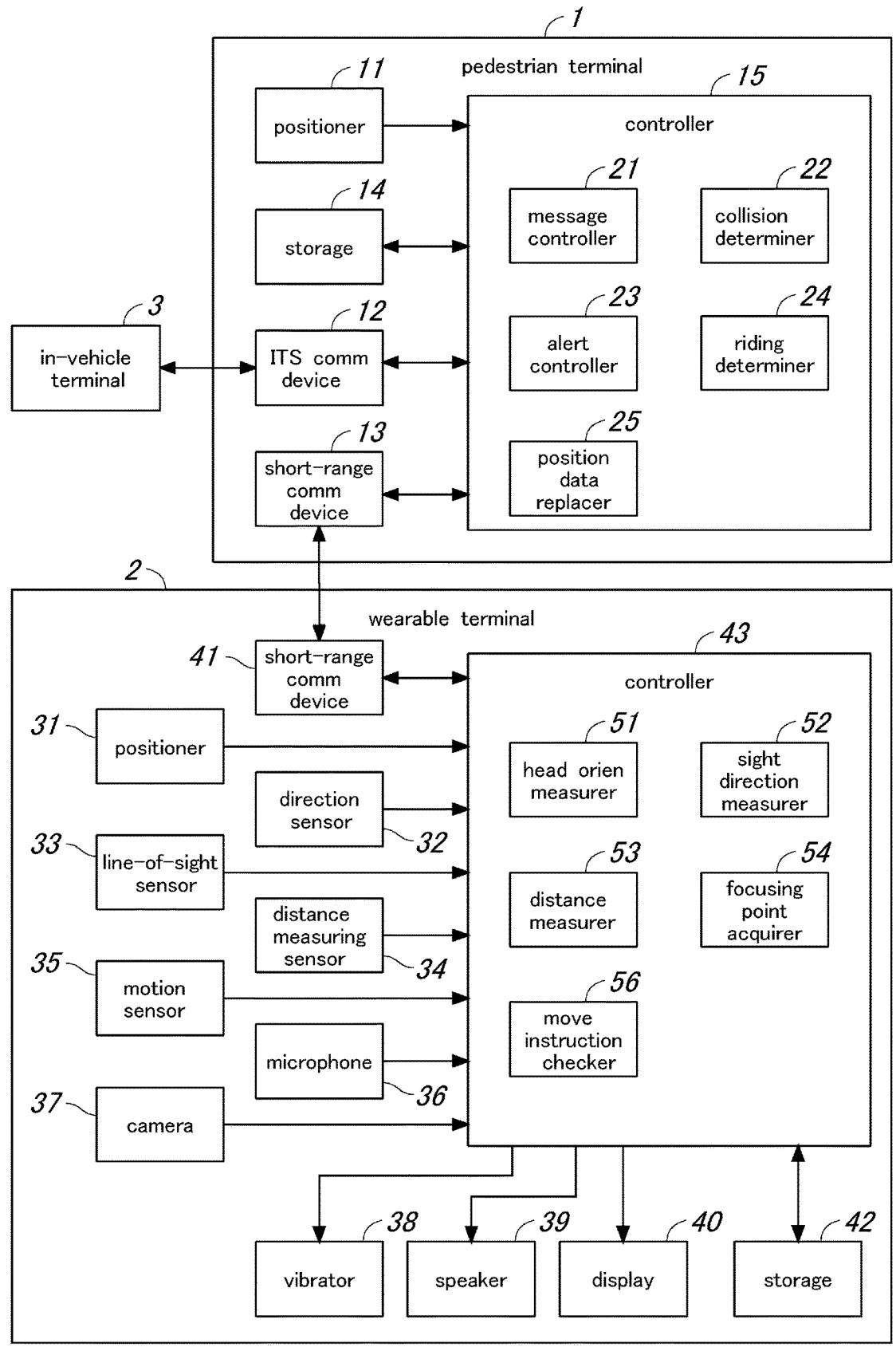
FIG. 7 is a block diagram showing a schematic configuration of a pedestrian terminal 1 and a wearable terminal 2 according to the second embodiment.

Next, a pedestrian terminal 1 and a wearable terminal 2 according to the second embodiment will be described. FIG. 7 is a block diagram showing a schematic configuration of a pedestrian terminal 1 and a wearable terminal 2.

The controller 15 of the pedestrian terminal 1 is the same as that of the first embodiment (See FIG. 2) except that the controller 15 further includes a riding determiner 24 and a position data replacer 25.

The riding determiner 24 determines whether or not the user is in the vehicle. When the user is in the vehicle, satellite radio waves are blocked by the vehicle body, making it difficult for the satellite radio waves to reach the pedestrian terminal 1. Based on this fact, the riding determiner 24 can determine that the user is in the vehicle when the satellite radio wave intensity received by the pedestrian terminal 1 is low. The riding determiner 24 can also determine that the user is in the vehicle when the position of the user is the same as that of the vehicle. In cases where a vibration sensor (not shown) is provided in the pedestrian terminal 1, the riding determiner 24 can also determine that the user is in the vehicle when the vibration sensor detects a vibration of the traveling vehicle. Furthermore, the riding determiner 24 can use any combination of these determination methods as appropriate to determine whether or not the user is in the vehicle.

When the riding determiner 24 determines that the user is in the vehicle, the position data replacer 25 replaces the user's position data with the vehicle's position data included in the message from the in-vehicle terminal 3 received at the ITS communication device 62. Since the vehicle's position data is more accurate than the user's position data, the replacement of the position data ensures improved accuracy of data indicating the user's position.

The controller 43 of the wearable terminal 2 is the same as that of the first embodiment (See FIG. 2) except that the controller 43 further includes a move instruction checker 56.

The move instruction checker 56 presents the sight focusing location to a user as a target location (a destination location for the vehicle to move toward), and when detecting the user's action (instruction action) for instructing the vehicle to move toward the target location, the move instruction checker 56 determines that the user has instructed the vehicle to move toward the target location (sight focusing location). A user may take an instruction action according to the detection results of the motion sensor 35, the microphone 36, and the camera 37 in the same manner as the first embodiment.

Figure 8:
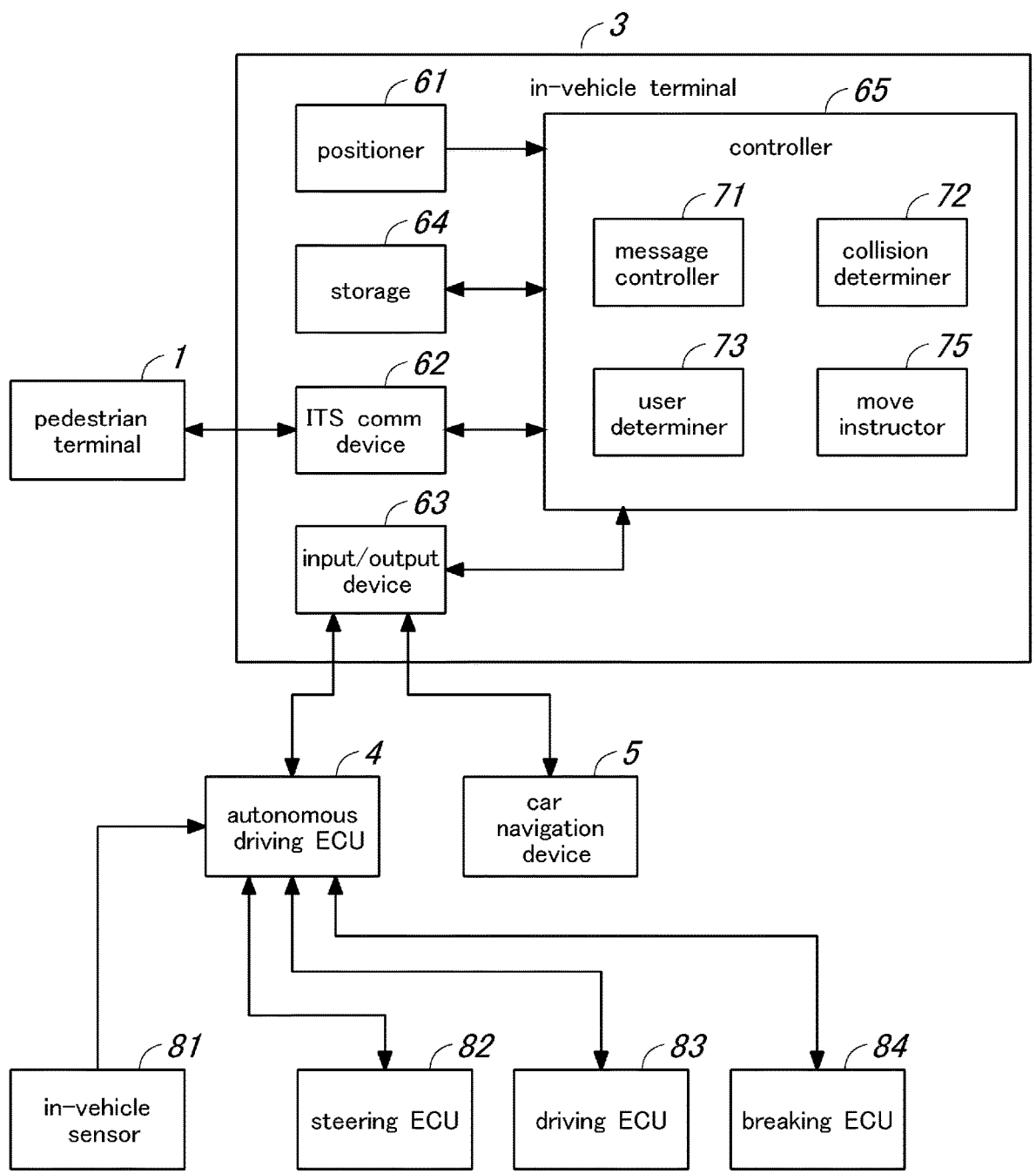
FIG. 8 is a block diagram showing a schematic configuration of an in-vehicle terminal 3 according to the second embodiment.

Next, a schematic configuration of an in-vehicle terminal 3 according to the second embodiment will be described. FIG. 8 is a block diagram showing a schematic configuration of an in-vehicle terminal 3.

The controller 65 of the in-vehicle terminal 3 is the same as that of the first embodiment (See FIG. 4) except that the controller 65 further includes a move instructor 75.

When the user determiner 73 determines that the terminal ID of the pedestrian terminal 1 included in a message from the pedestrian terminal 1 matches that of the pedestrian terminal 1 carried by the registered user, the move instructor 75 provides, based on the position data of a target location included in the message from the pedestrian terminal 1, control information to the autonomous driving ECU 4 to move the vehicle toward the target location. Based on the control information from the in-vehicle terminal 3, the autonomous driving ECU 4 performs control so as to move the vehicle toward the target location.

Figure 9:
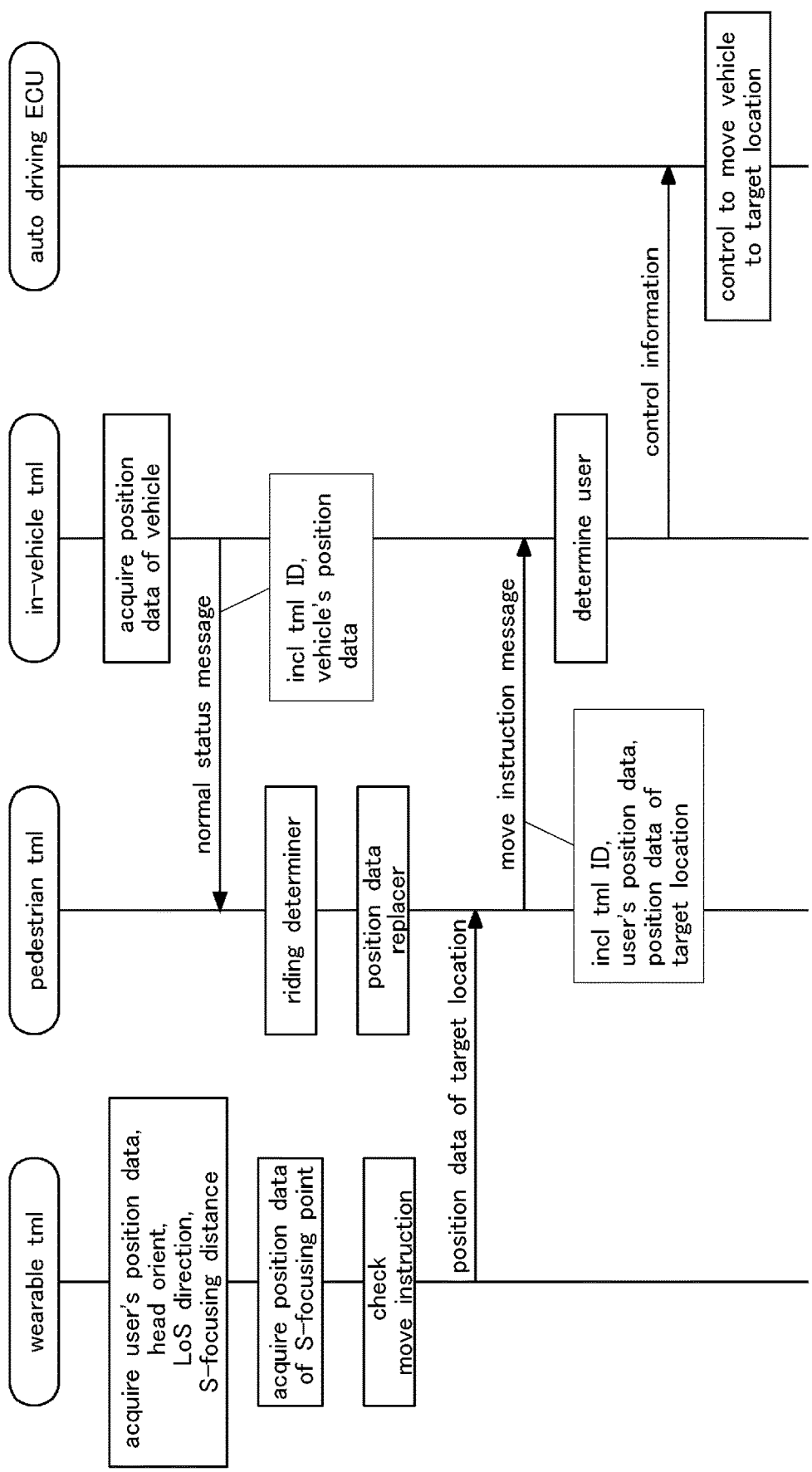
FIG. 9 is a sequence diagram showing an outline of an operation procedure of the mobile body guidance system according to the second embodiment.

Next, an operation procedure of the mobile body guidance system according to the second embodiment will be described. FIG. 9 is a sequence diagram showing an outline of an operation procedure of the mobile body guidance system.

The wearable terminal 2 acquires the user's position data, the head orientation, the line-of-sight direction, and the sight focusing distance, and based on these data, the wearable terminal 2 acquires the position data of the sight focusing location at which the user looks, in the same manner as the first embodiment (See FIG. 2).

Next, in the wearable terminal 2, the move instruction checker 56 presents the sight focusing location to the user, in order to urge the user to indicate whether or not the user approves the sight focusing location as a target location. Then, when detecting a user's action (instruction action) indicating the user's approval for determination of the target location, the move instruction checker 56 determines that the user has instructed the vehicle to move toward the target location (sight focusing location). Then, the short-range communication device 41 of the wearable terminal 2 transmits the position data of the target location (the position data of the sight focusing location) to the pedestrian terminal 1.

In the in-vehicle terminal 3, the positioner 61 acquires the position data of the vehicle, and the message controller 71 causes the ITS communication device 62 to transmit a normal status massage to the pedestrian terminal 1. The message includes the terminal ID of the in-vehicle terminal 3 (the vehicle ID of the vehicle) and the position data (latitude, longitude) of the vehicle.

In the pedestrian terminal 1, when the ITS communication device 12 receives the normal status massage from the in-vehicle terminal 3, the riding determiner 24 determines whether or not the user is in the vehicle by performing necessary operations such as comparing the vehicle's position data included in the received message with the user's position data acquired by the positioner 11. When the riding determiner 24 determines that the user is in the vehicle, the position data replacer 25 replaces the user's position data with the vehicle's position data. When the riding determiner 24 determines that the user is not in the vehicle, the replacement of position data is not performed.

In the pedestrian terminal 1, when the short-range communication device 13 receives the position data of the target location from the wearable terminal 2, the message controller 21 generates a move instruction message, and then the ITS communication device 12 transmits the move instruction message to the in-vehicle terminal 3. The move instruction message includes the terminal ID of the pedestrian terminal 1 which is the source of message, the user's position data (latitude, longitude) and head orientation data, and the position data (latitude, longitude) of the target location.

In the in-vehicle terminal 3, the positioner 61 acquires the position data of the vehicle, and when the ITS communication device 62 receives the move instruction message from the pedestrian terminal 1, the user determiner 73 determines whether or not the user instructing the vehicle to move is an authorized user, who is allowed to use the vehicle.

Next, in the in-vehicle terminal 3, when the user determiner 73 determines that the user instructing the vehicle to move is an authorized user, the move instructor 75 provides control information to the autonomous driving ECU 4 to move the vehicle toward the target location. The control information includes the position data of the target location and the position data of the vehicle.

Based on the control information provided from the in-vehicle terminal 3, the autonomous driving ECU 4 controls the steering ECU 82, the driving ECU 83, and the braking ECU 84 so as to move the vehicle toward the target location.

Third Embodiment

Figure 10:
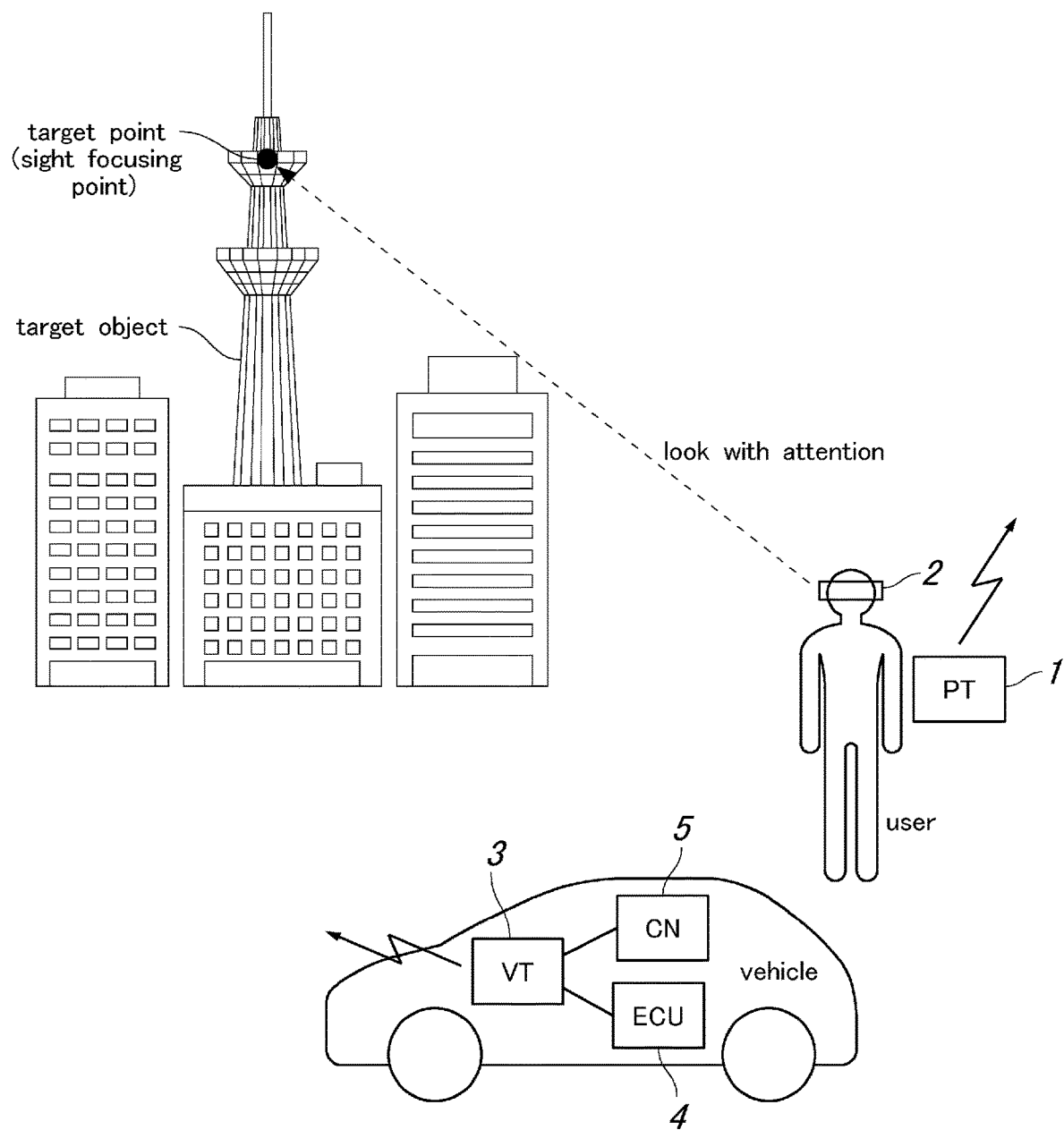
FIG. 10 is a diagram showing a general configuration of a mobile body guidance system according to a third embodiment of the present invention.

Next, a third embodiment of the present invention will be described. Except for what will be discussed here, the third embodiment is the same as the above-described embodiments. FIG. 10 is a diagram showing a general configuration of a mobile body guidance system of the third embodiment.

In the above-described embodiments, the system is configured such that a user guides a vehicle to a target location through line-of-sight-based guidance. However, in some cases, a user wishes to move a vehicle to a target object seen in the distance, i.e., located far off. In this view, in the present embodiment, a system is configured such that a user looks at a target object located in the distance to determine the location of the target object as a target location, thereby moving the vehicle to the target location.

In this case, since the target object is seen in the distance, the target object is tall or located at the higher latitudes. Specifically, examples of the target object include a mountain, a building such as a tower, a ferris wheel, or a skyscraper. The target object may be a flying object such as a balloon or a hang glider.

In the present embodiment, a target location is determined as the intersecting point between a perpendicular line drawn from a user's sight focusing point and a reference horizontal plane (a horizontal plane in which the user is present), the system is configured to acquire 2D position data (latitude, longitude) of the target location. Then, the system causes the car navigation device 5 to perform route guidance, acquires information on the route from the current location to the target location from the car navigation device 5, and controls the autonomous driving ECU 4.

In the present embodiment, a user may be located outside the vehicle or inside the vehicle. When a user is inside the vehicle, the user's position data may be replaced with the vehicle's position data in the same manner as the second embodiment. The mobile object to be guided through line-of-sight-based guidance may be a skycar (or flying vehicle), and the system may be configured such that a user riding in the skycar can fly the skycar by using line-of-sight-based guidance. In this case, a user may look at a landing point located below, thereby moving the skycar downward. For example, a user can look at a landing point, thereby landing the skycar there.

Figure 11:
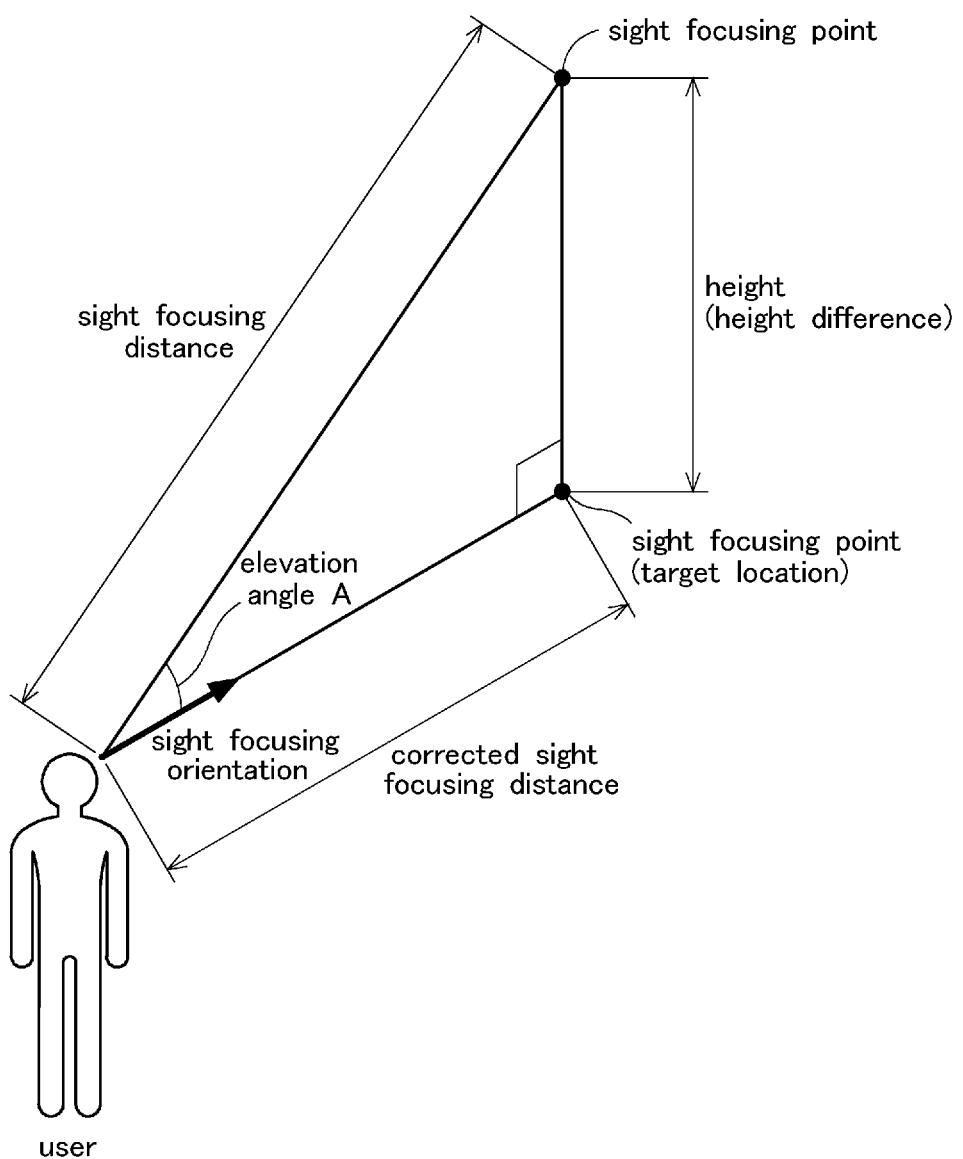
FIG. 11 is an explanatory diagram showing an outline of operations performed by a focusing point acquirer 54 of the wearable terminal 2 according to the third embodiment.

Next, operations performed by a focusing point acquirer 54 of the wearable terminal 2 according to the third embodiment will be described. FIG. 11 is an explanatory diagram showing an outline of operations performed by the focusing point acquirer 54 of the wearable terminal 2.

The focusing point acquirer 54 calculates the orientation toward an object (target object) at which a user looks (sight focusing orientation) based on the user's head orientation acquired by the head orientation measurer 51 and the line-of-sight direction acquired by the sight direction measurer 52. Then, the focusing point acquirer 54 acquires the position data (latitude, longitude) of a location (sight focusing location) at which the user looks based on the sight focusing orientation, the sight focusing distance acquired by the distance measurer 53, and the user's position data.

In this case, since the user looks diagonally upward at the target object, the sight focusing distance acquired by the distance measurer 53 is longer than the horizontal distance from the current location to the target location. Thus, the measured sight focusing distance needs to be corrected to be the horizontal distance.

In the present embodiment, the system measures the elevation angle A of the user's line of sight based on the detection result of the motion sensor 35 (tilt sensor) of the wearable terminal 2. Then, the system calculates the corrected sight focusing distance using the elevation angle A and the following equation:

corrected sight focusing distance=sight focusing distance×cos $A$.

Furthermore, the system calculates the height (altitude difference) from the sight focusing distance and the elevation angle A by using the following equation:

height=sight focusing distance×sin $A$.

The elevation angle may be the elevation angle of the user's head or the elevation angle of the user's line of sight. The elevation angle of the user's head can be measured by using the motion sensor 35 (tilt sensor) of the wearable terminal 2, and the elevation angle of the user's line of sight can be measured by using the line-of-sight sensor 33 of the wearable terminal 2.

Figure 12:
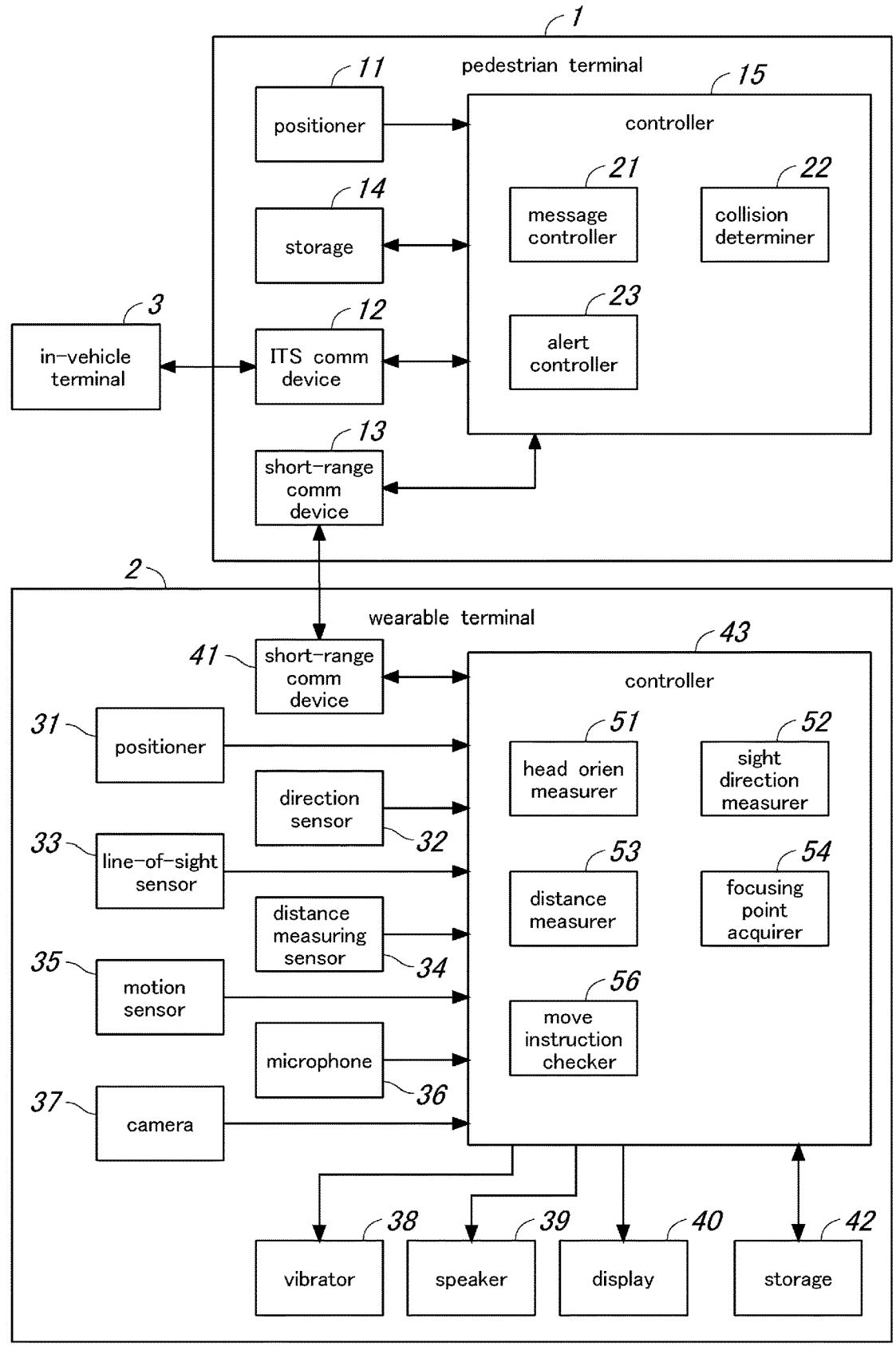
FIG. 12 is a block diagram showing a schematic configuration of a pedestrian terminal 1 and a wearable terminal 2 according to the third embodiment.

Next, a schematic configuration of a pedestrian terminal 1 and a wearable terminal 2 according to the third embodiment will be described. FIG. 12 is a block diagram showing a schematic configuration of a pedestrian terminal 1 and a wearable terminal 2.

A controller 43 of the wearable terminal 2 includes a move instruction checker 56 as in the second embodiment (See FIG. 7).

The configuration of the pedestrian terminal 1 according to the present embodiment is the same as that of the first embodiment. Also, the configuration of the in-vehicle terminal 3 according to the present embodiment is the same as that of the second embodiment (See FIG. 8).

Figure 13:
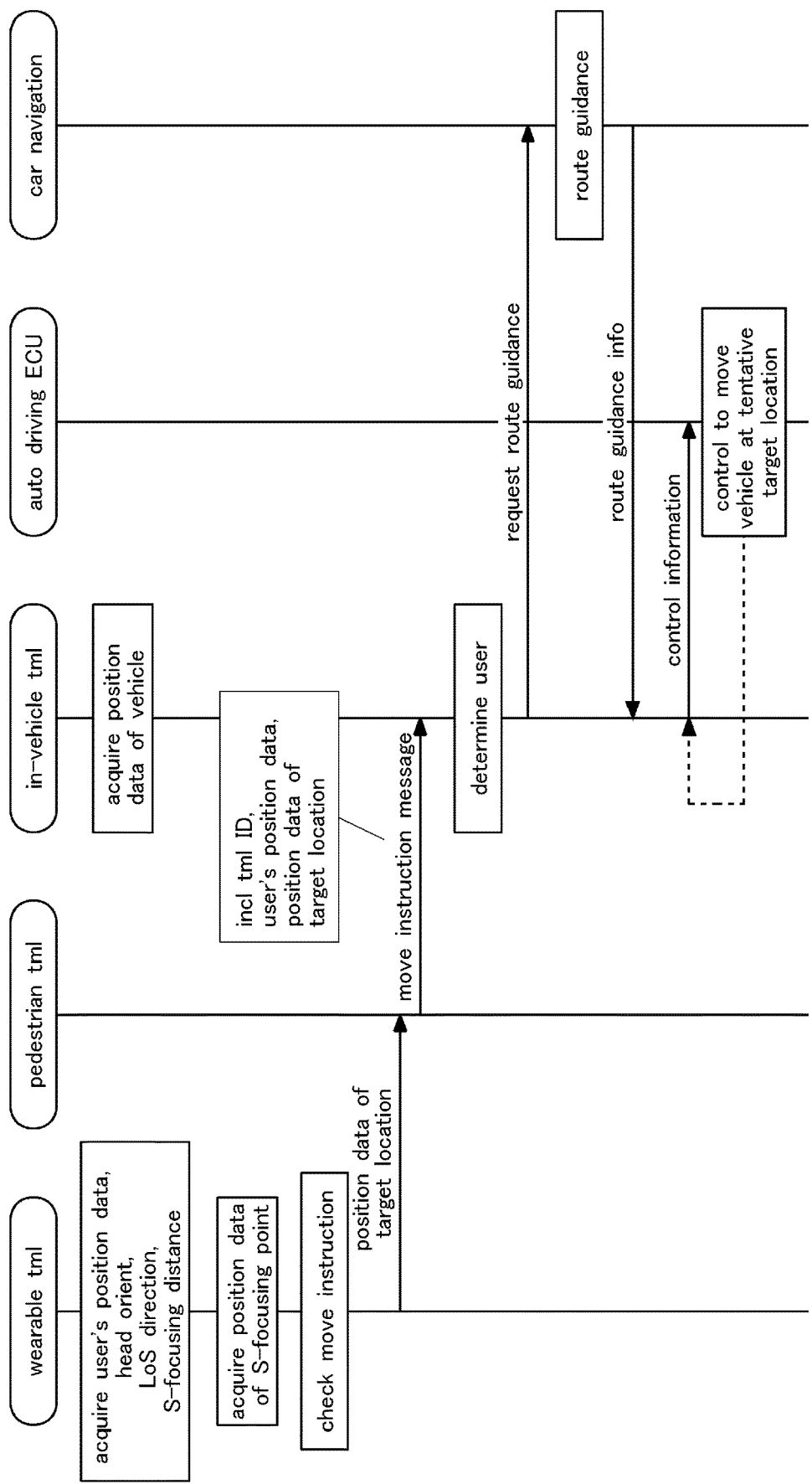
FIG. 13 is a sequence diagram showing an outline of an operation procedure of the mobile body guidance system according to the third embodiment.

Next, an operation procedure of the mobile body guidance system according to the third embodiment will be described. FIG. 13 is a sequence diagram showing an outline of an operation procedure of the mobile body guidance system.

The wearable terminal 2 acquires the user's position data, the head orientation, the line-of-sight direction, and the sight focusing distance, and based on these data, acquires the position data of the sight focusing location at which the user looks, in the same manner as the second embodiment (See FIG. 9). The move instruction checker 56 determines that the user has instructed to move the vehicle toward the target location (sight focusing location), and the position data of the target location is transmitted to the pedestrian terminal 1.

In the pedestrian terminal 1, when the short-range communication device 13 receives the position data of the target location from the wearable terminal 2, the message controller 21 generates a move instruction message, and then the ITS communication device 12 transmits the move instruction message to the in-vehicle terminal 3.

In the in-vehicle terminal 3, the positioner 61 acquires the position data of the vehicle, and when the ITS communication device 62 receives the move instruction message from the pedestrian terminal 1, the user determiner 73 determines whether or not the user instructing the vehicle to move toward the target location is an authorized user, who is allowed to use the vehicle.

Next, in the in-vehicle terminal 3, when the user determiner 73 determines that the user instructing the vehicle to move is an authorized user, the move instructor 75 provides control information for requesting route guidance to the car navigation device 5, thereby causing the car navigation device 5 to provide route guidance, and then the move instructor 75 acquires route information on a route from the current location to the target location, to thereby control the autonomous driving ECU 4.

Specifically, the move instructor 75 determines a tentative target location based on the acquired route information, and provides control information for moving the vehicle toward the tentative target location, to the autonomous driving 4. The control information includes the position data of the tentative target location and the position data of the vehicle.

Based on the control information provided from the in-vehicle terminal 3, the autonomous driving ECU 4 controls the steering ECU 82, the driving ECU 83, and the braking ECU 84 so as to move the vehicle toward the tentative target location.

In this way, the vehicle moves toward the tentative target location to reach the tentative target location, which means that the current position of the vehicle matches the tentative target location. Then, the in-vehicle terminal 3 determines the next tentative target location. The in-vehicle terminal 3 repeats operations of determining such a tentative target location and moving the vehicle to the tentative target location, whereby the vehicle reaches the final target location.

Fourth Embodiment

Figure 14:
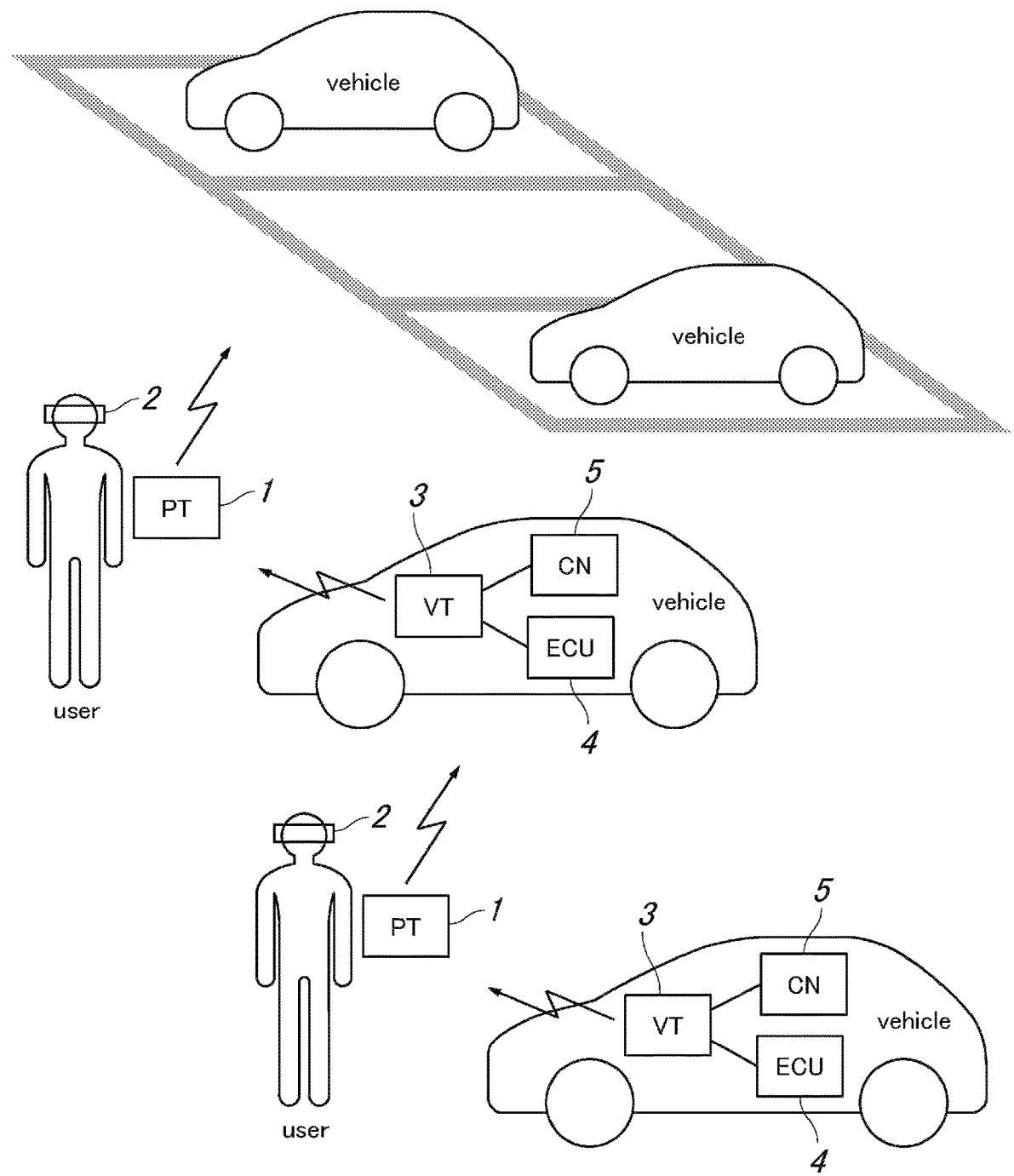
FIG. 14 is a diagram showing a general configuration of a mobile body guidance system according to a fourth embodiment of the present invention.

Next, a fourth embodiment of the present invention will be described. Except for what will be discussed here, the fourth embodiment is the same as the above-described embodiments. FIG. 14 is a diagram showing a general configuration of a mobile body guidance system according to the fourth embodiment.

In the above-described embodiments, the system is configured such that a user guides a vehicle to a target location through line-of-sight-based guidance. However, in some cases, two or more users guide their vehicles to the same target location (e.g., the same parking space) approximately at the same time, the users are unable to move the vehicles to that location. In this view, in the present embodiment, a system is configured to give users respective priorities based on a predetermined criterion, and move the vehicle of a user with a higher priority to the target location, while changing the target location of the vehicle of a user with a lower priority. In the present embodiment, the system prioritizes a vehicle which is guided by a user through line-of-sight-based guidance at an earlier timing.

In the pedestrian terminal 1, the ITS communication device 12 can also receive a move instruction (park instruction) message transmitted by a different pedestrian terminal 1. Thus, in the present embodiment, from the move instruction message received from the different pedestrian terminal 1, the pedestrian terminal 1 recognizes or acquires the order of timings of providing line-of-sight-based guidance to the pedestrian terminal 1 and to the different pedestrian terminal 1, thereby determining the priority of the pedestrian terminal 1.

The present embodiment will be described with reference to an example in which a user guides the vehicle to a parking space through line-of-sight-based guidance. However, any place may be the target location to which the vehicle is guided through line-of-sight-based guidance.

In the present embodiment, a higher priority is given to a pedestrian terminal 1 to which a park instruction is provided earlier. However, the priority may be determined based on an attribute of the user.

Figure 15:
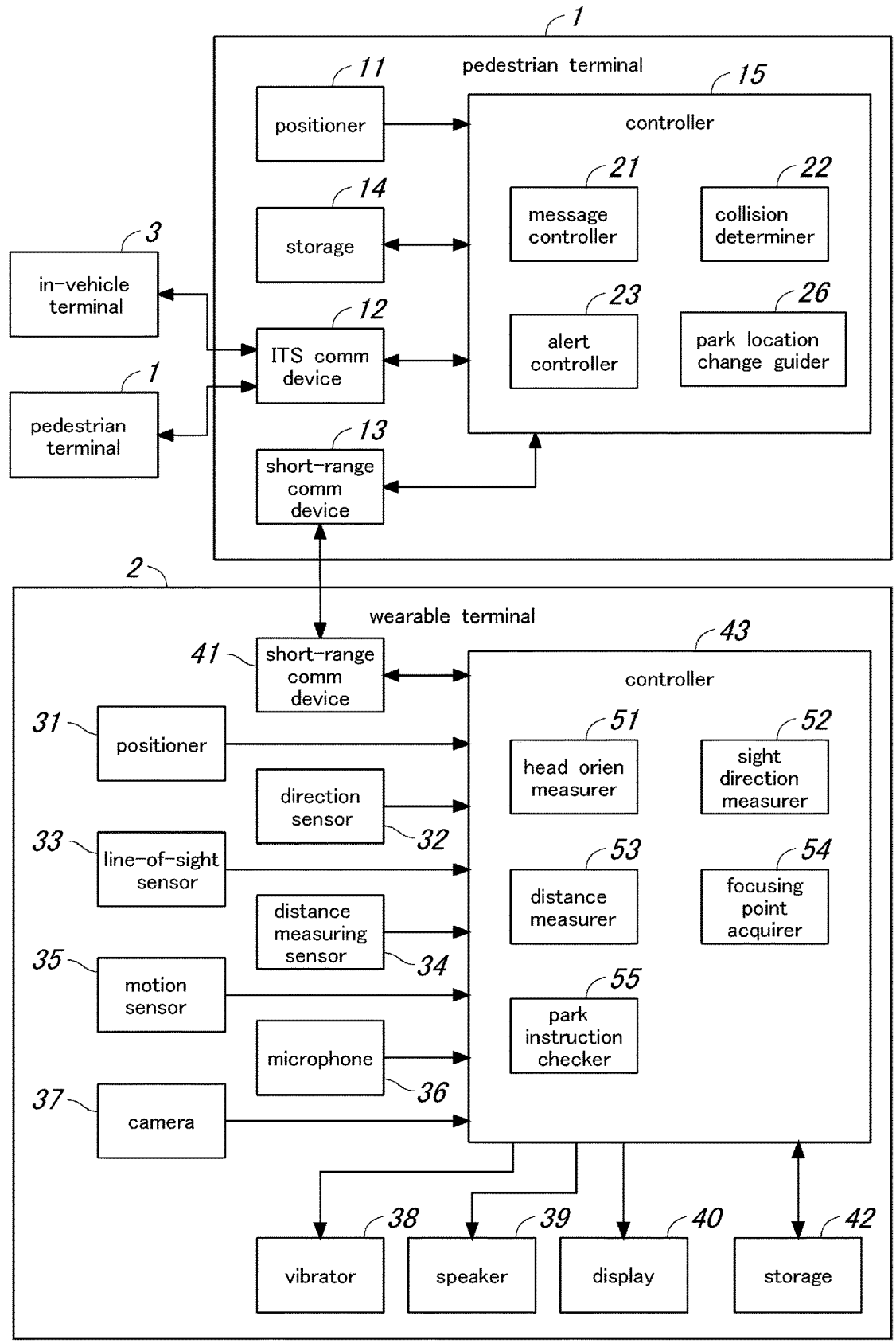
FIG. 15 is a block diagram showing a schematic configuration of a pedestrian terminal 1 and a wearable terminal 2 according to the fourth embodiment.

Next, a schematic configuration of a pedestrian terminal 1 and a wearable terminal 2 according to the fourth embodiment will be described. FIG. 15 is a block diagram showing a schematic configuration of a pedestrian terminal 1 and a wearable terminal 2.

The controller 15 of the pedestrian terminal 1 is the same as that of the first embodiment (See FIG. 2) except that the controller 15 further includes a park location change guider 26.

When receiving the park instruction message transmitted from the different pedestrian terminal 1, the park location change guider 26 determines whether or not the vehicle's parking location matches the parking location of the different vehicle, based on the position data of the parking location included in the message. When the vehicle's parking location matches the parking location of the different vehicle, the park location change guider 26 acquires the order of timings of providing line-of-sight-based guidance to the pedestrian terminal 1 and to the different pedestrian terminal 1, thereby determining the priority of the pedestrian terminal 1. Then, when determining that the priory is lower, the pedestrian terminal 1 controls the wearable terminal 2 so as to guide the user to change the target location.

In this case, when having already transmitted the park instruction message before receiving the park instruction message from the different pedestrian terminal 1, the pedestrian terminal 1 determines that it has a higher priority. When having received the park instruction message from the different pedestrian terminal before transmitting the park instruction message, the pedestrian terminal 1 determines that it has a lower priority.

The configuration of the wearable terminal 2 according to the present embodiment is the same as that of the first embodiment (See FIG. 2). The configuration of the in-vehicle terminal 3 according to the present embodiment is also the same as that of the first embodiment (See FIG. 4).

Figure 16:
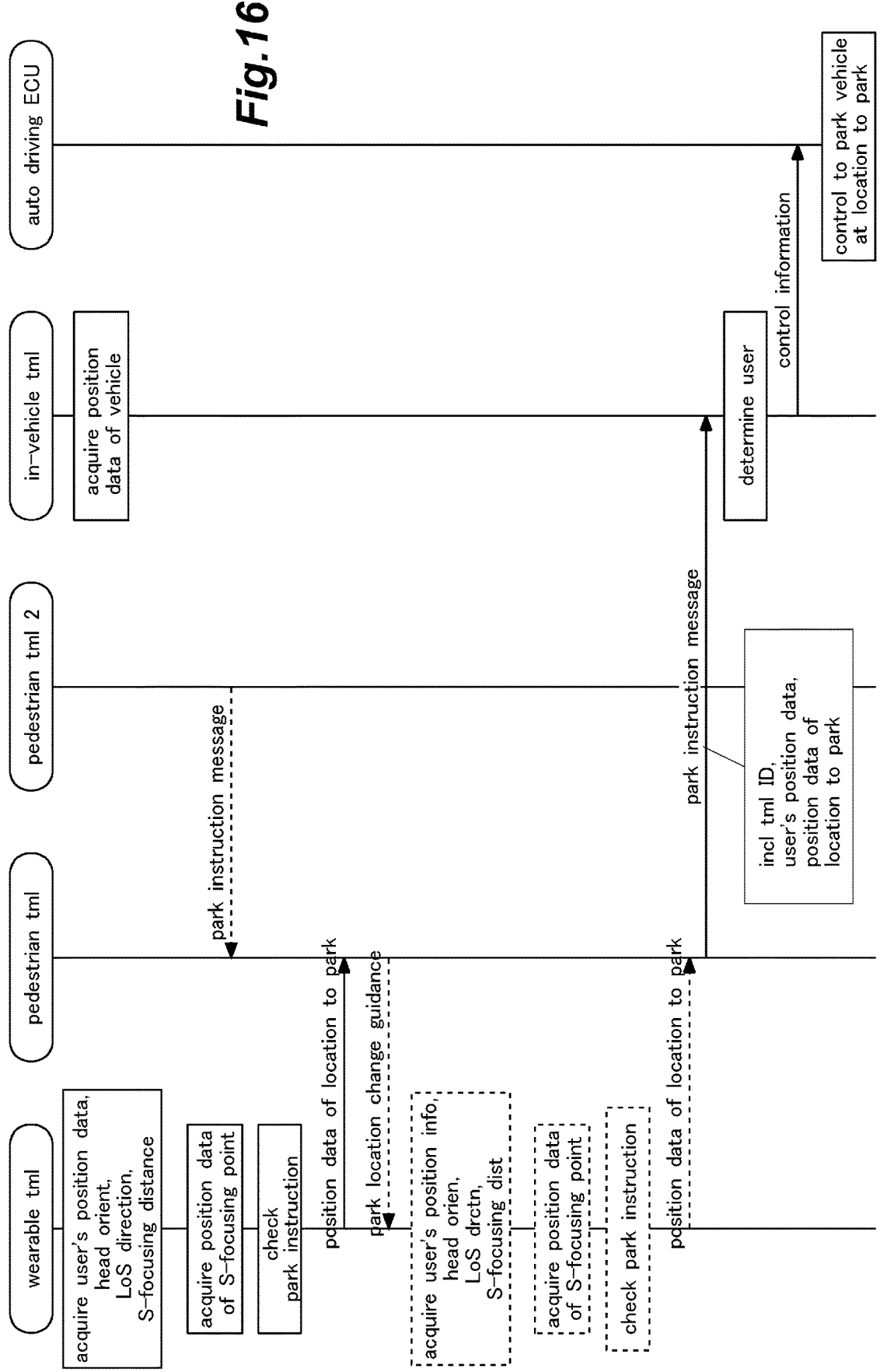
FIG. 16 is a sequence diagram showing an outline of an operation procedure of the mobile body guidance system according to the fourth embodiment.

Next, an operation procedure of the mobile body guidance system according to the fourth embodiment will be described. FIG. 16 is a sequence diagram showing an outline of an operation procedure of the mobile body guidance system.

The wearable terminal 2 acquires the user's position data, the head orientation, the line-of-sight direction, and the sight focusing distance in the same manner as the first embodiment (See FIG. 5). Next, the focusing point acquirer 54 acquires the position data of the sight focusing location at which the user looks, based on the user's position data, the head orientation, the line-of-sight direction, and the sight focusing distance. The park instruction checker 55 determines that the user has instructed to move the vehicle toward the target location (sight focusing location), and the wearable terminal 2 transmits the position data of the target location to the pedestrian terminal 1.

In the pedestrian terminal 1, when the short-range communication device 13 receives the position data of the target location from the wearable terminal 2, the park location change guider 26 determines whether or not the conditions for providing park location change guidance are met; that is, whether or not the pedestrian terminal 1 has already received a park instruction message transmitted from a different pedestrian terminal 1 and the target location of the pedestrian terminal 1 matches that of the different pedestrian terminal 1. When the conditions for providing park location change guidance are met, the park location change guider 26 determines that the pedestrian terminal 1 has a lower priority, and the controller 15 controls the wearable terminal 2 so as to guide the user to change the target location.

In this case, the wearable terminal 2 repeats operations of acquiring the user's position data, the head direction, the line-of-sight direction, and the sight focusing distance; acquiring the position data of the user's sight focusing location; and determining that the user has instructed to move the vehicle toward the target location, and transmits target location information designating a different target location to the pedestrian terminal 1.

In the pedestrian terminal 1, when the short-range communication device 13 receives the position data of the target location from the wearable terminal 2, the park location change guider 26 determines whether or not the conditions for providing park location change guidance are met. When the conditions for providing park location change guidance are not met, the message controller 21 generates a move instruction message, and then the ITS communication device 12 transmits the move instruction message to the in-vehicle terminal 3. The subsequent operations are the same as in the first embodiment (See FIG. 5).

In the present embodiment, the system prioritizes the vehicle of a user who has provided line-of-sight-based guidance at an earlier timing. However, the present invention is not limited to this prioritization, and the vehicle of a different user may be prioritized under the same condition. For example, a vehicle which is to be prioritized may be a vehicle in which an aged person or a disabled person is riding, a vehicle driven by a newly licensed driver, a vehicle driven by a newly licensed driver, a vehicle driven by an automotively challenged person, or a vehicle in which an ailing person is riding. In some cases, in hospitals or other facilities, the priority of vehicles may be determined based on the medical condition of the passenger.

Fifth Embodiment

Figure 17:
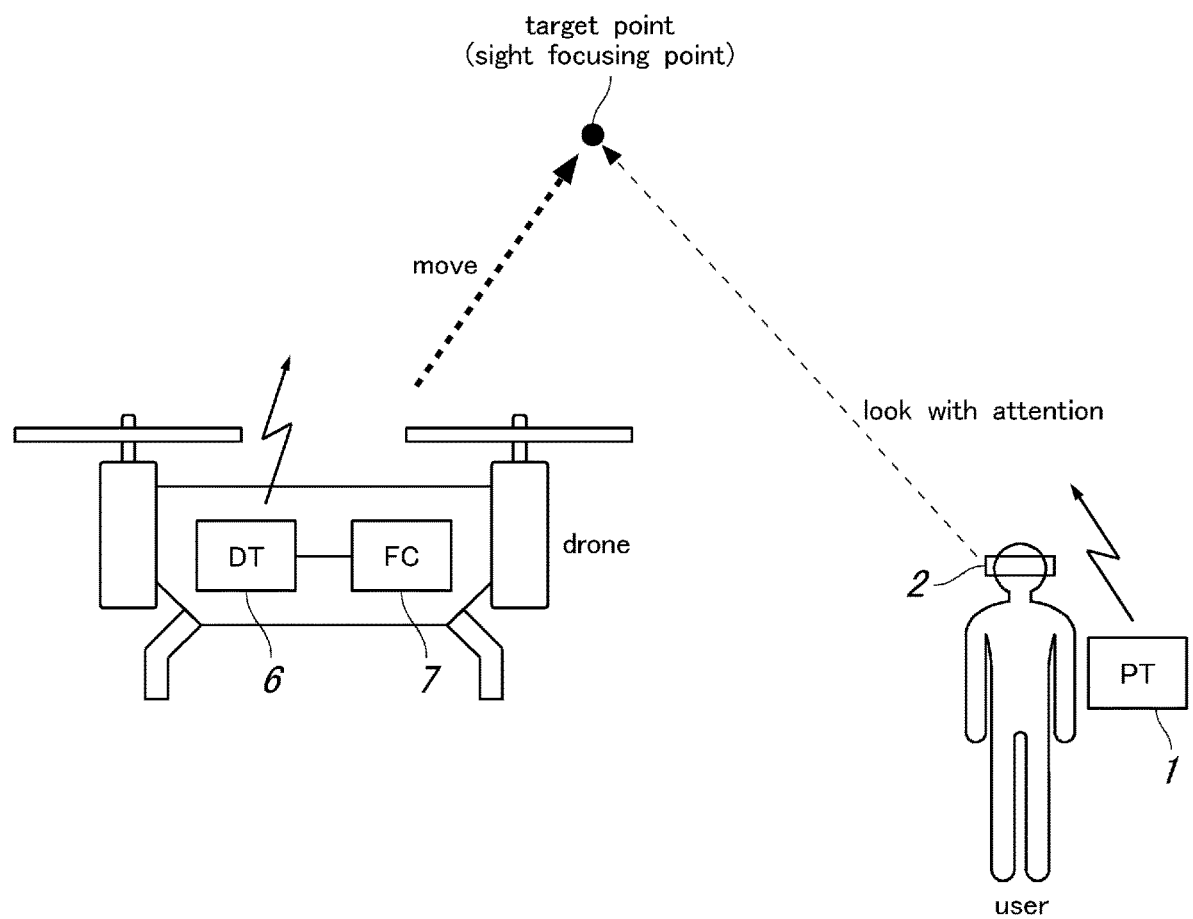
FIG. 17 is a diagram showing a general configuration of a mobile body guidance system according to a fifth embodiment of the present invention.

Next, a fifth embodiment of the present invention will be described. Except for what will be discussed here, the fifth embodiment is the same as the above-described embodiments. FIG. 17 is a diagram showing a general configuration of a mobile body guidance system according to the fifth embodiment.

In the above-described embodiments, the system is configured such that a user guides a vehicle (autonomous driving vehicle) to a parking space (designated parking location) through line-of-sight-based guidance. In the present embodiment, the system is configured such that a user guides a drone (a mobile body which has autonomous flight capability) through line-of-sight-based guidance.

The mobile body guidance system includes an in-drone terminal 6 and a flight control device 7 (mobile controller, flight controller). The in-drone terminal 6 and the flight control device 7 are mounted in the drone.

The in-drone terminal 6 transmits and receives messages including position data to and from the pedestrian terminal 1, a different in-drone terminal 6, and an in-vehicle terminal 3 mounted in a vehicle through ITS communications, and determines if there is a risk of collision between the drone and a pedestrian, a different drone or a different vehicle.

The flight control device 7 performs automatic flight (autonomous flight) of the drone based on control information provided from the in-drone terminal 6.

Figure 18:
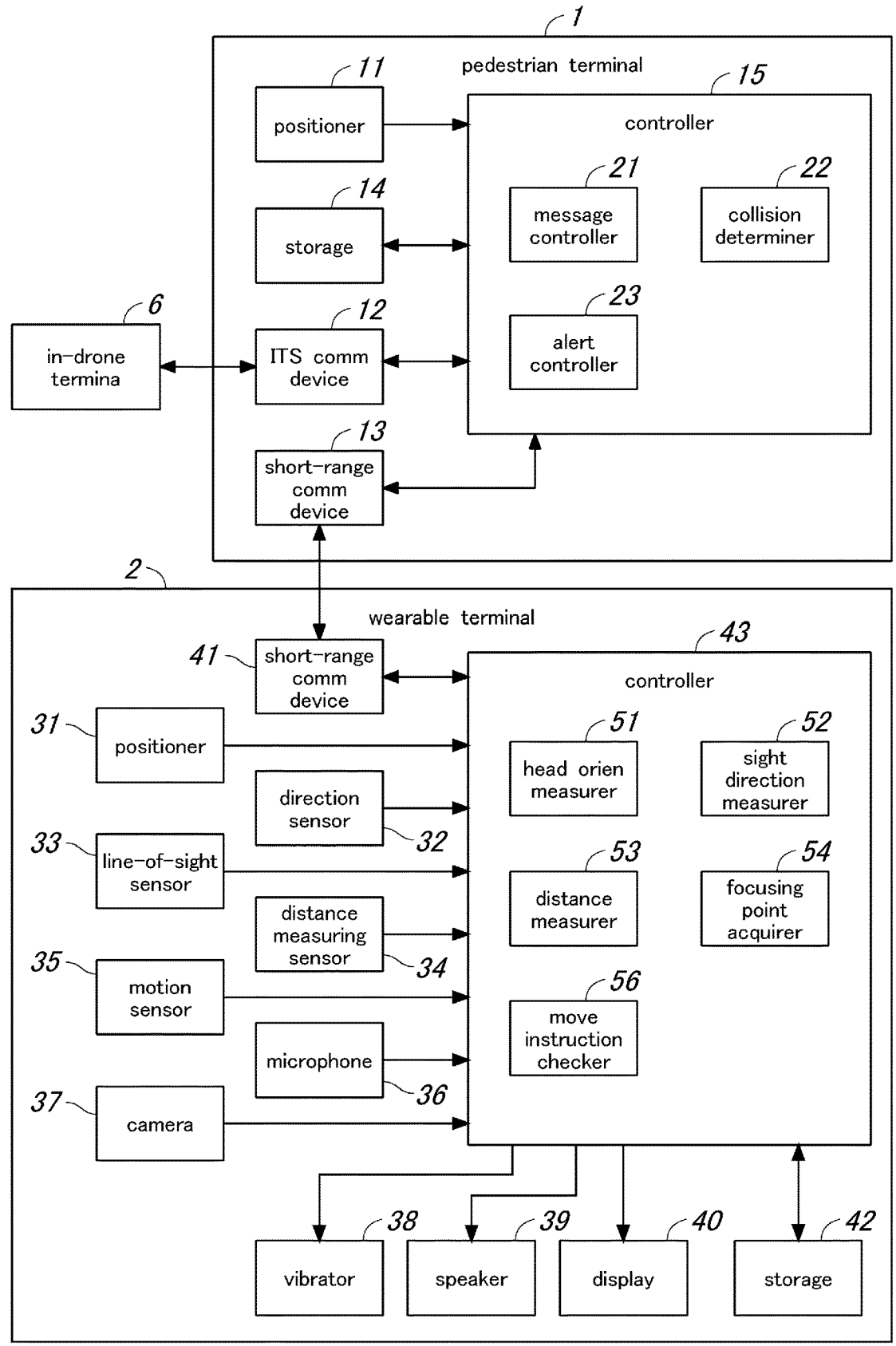
FIG. 18 is a block diagram showing a schematic configuration of a pedestrian terminal 1 and a wearable terminal 2 according to the fifth embodiment.

Next, a schematic configuration of a pedestrian terminal 1 and a wearable terminal 2 according to the fifth embodiment will be described. FIG. 18 is a block diagram showing a schematic configuration of a pedestrian terminal 1 and a wearable terminal 2.

The configuration of the pedestrian terminal 1 is the same as that of the third embodiment (See FIG. 12) except that the ITS communication device 12 transmits and receives messages to and from the in-drone terminal 6 through ITS communications.

The configuration of the wearable terminal 2 is the same as that of the third embodiment (See FIG. 12) except that the focusing point acquirer 54 acquires 3D position data (latitude, longitude, altitude) of the sight focusing point at which the user looks. The focusing point acquirer 54 calculates the orientation toward the point at which the user looks (sight focusing orientation) based on the user's head orientation and line-of-sight direction. The sight focusing orientation is determined as 3D direction (azimuth, elevation angle). Then, the focusing point acquirer 54 determines the position data (latitude, longitude, altitude) of a sight focusing point based on the user's position and the user's sight focusing orientation and sight focusing distance.

Figure 19:
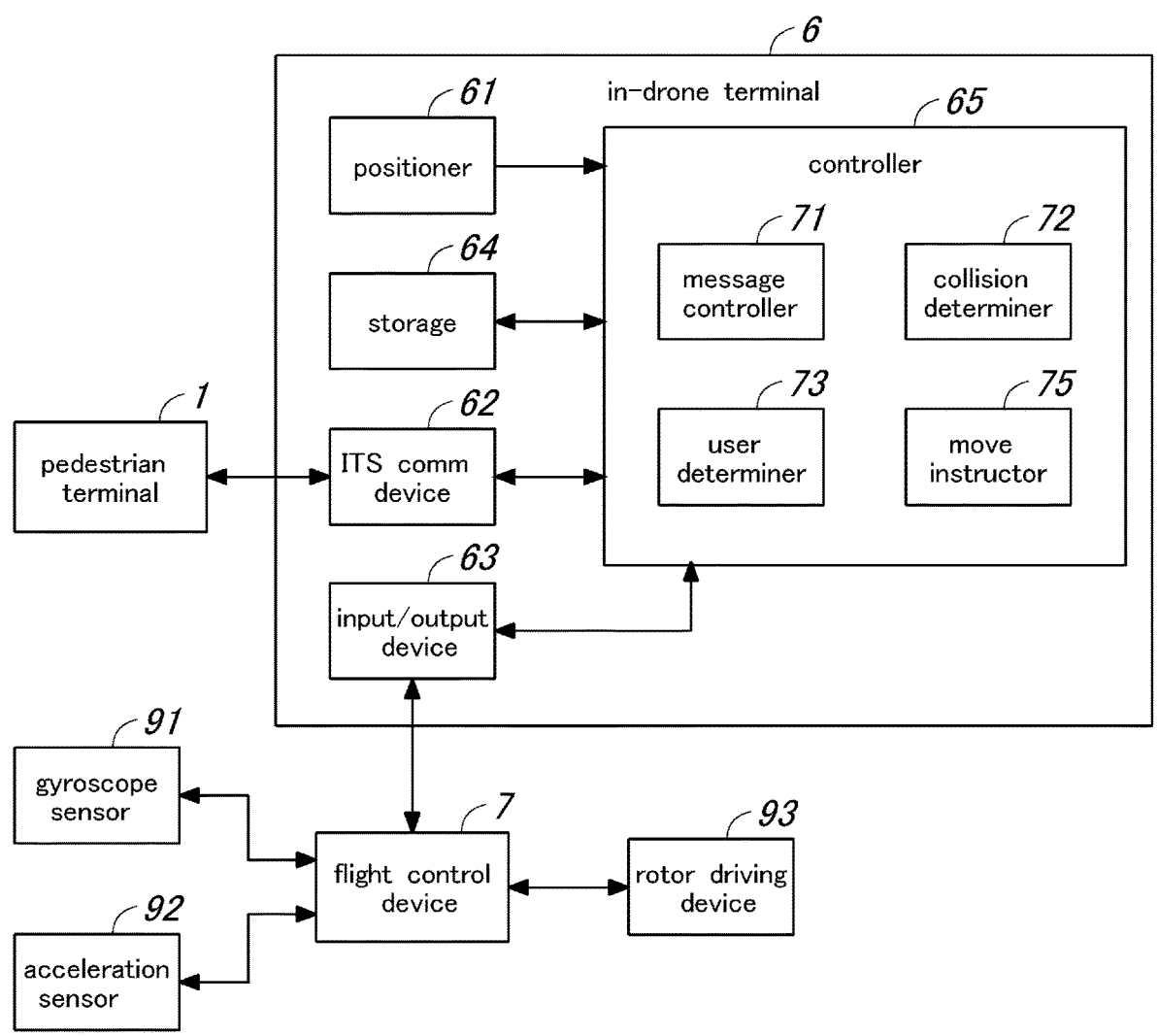
FIG. 19 is a block diagram showing a schematic configuration of an in-drone terminal 6 according to the fifth embodiment.

Next, a schematic configuration of the in-drone terminal 6 according to the fifth embodiment will be described. FIG. 19 is a block diagram showing a schematic configuration of an in-drone terminal 6.

The configuration of the in-drone terminal 6 is the same as that of the in-vehicle terminal 3 (See FIG. 8) except that the input/output device 63 receives and provides control information from and to the flight control device 7. The flight control device 7 is connected to a gyro sensor 91 and an acceleration sensor 92, and performs automatic flight (autonomous flight) of the drone based on the detection results of the gyro sensor 91 and the acceleration sensor 92.

Figure 20:
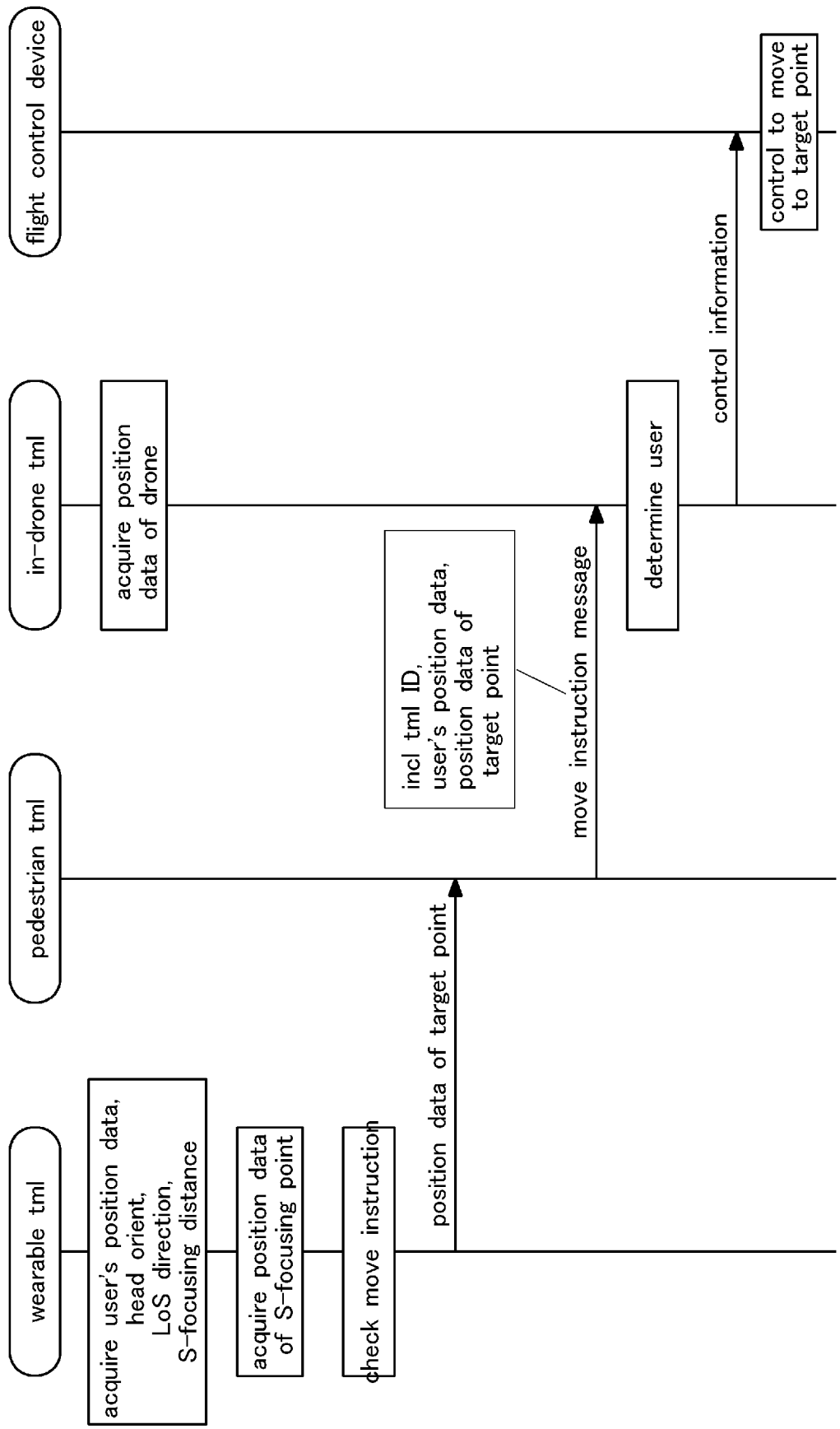
FIG. 20 is a sequence diagram showing an outline of an operation procedure of the mobile body guidance system according to the fifth embodiment.

Next, an outline of an operation procedure of the mobile body guidance system according to the fifth embodiment will be described. FIG. 20 is a sequence diagram showing an outline of an operation procedure of the mobile body guidance system.

The wearable terminal 2 acquires the user's position data, the head orientation, the line-of-sight direction, and the sight focusing distance in the same manner as the first embodiment (See FIG. 2). Next, the focusing point acquirer 54 determines the 3D position data (latitude, longitude, altitude) of a sight focusing point based on the user's position and the user's sight focusing orientation and sight focusing distance. The move instruction checker 56 determines that the user has instructed to move toward the target point (sight focusing point), and the wearable terminal 2 transmits the position data of the target point to the pedestrian terminal 1.

In the pedestrian terminal 1, when the short-range communication device 13 receives the position data of the target point from the wearable terminal 2, the message controller 21 generates a move instruction message, and then the ITS communication device 12 transmits the move instruction message to the in-drone terminal 6. This message includes the terminal ID of the pedestrian terminal 1 which is the source of message, the user's position data (latitude, longitude) and head orientation data, and the position data (latitude, longitude) of the target point.

In the in-drone terminal 6, the positioner 61 acquires the position data of the drone, and when the ITS communication device 62 receives the move instruction message from the pedestrian terminal 1, the user determiner 73 determines whether or not the user instructing the drone to move is an authorized user, who is allowed to use the drone.

Next, in the in-drone terminal 6, when the user determiner 73 determines that the user instructing the drone to move is an authorized user, the move instructor 75 provides control information to the flight control device 7 to move the drone toward the target point. The control information includes the position data of the target point and the position data of the drone.

Based on the control information provided from the in-drone terminal 6, the flight control device controls a rotor driving device 93 so as to move the drone toward the target point.

In some cases, a user wants to land the drone in a hurry because of an unforeseen situation. In such cases, the user may land the drone by taking a specific action such as blinking. In some embodiments, the specific action to land the drone may be blinking multiple times. In other embodiments, the drone can be returned to the point of departure. In this case, the specific user's actions may be determined such that user blinks twice to land the drone and blinks three times to return the drone to the point of departure.

The present invention is applicable to different types of robots other than drones in a similar manner. For example, in some embodiments, a user may designate a place where a cleaning robot should perform a cleaning operation through line-of-sight-based guidance.

Sixth Embodiment

Figure 21:
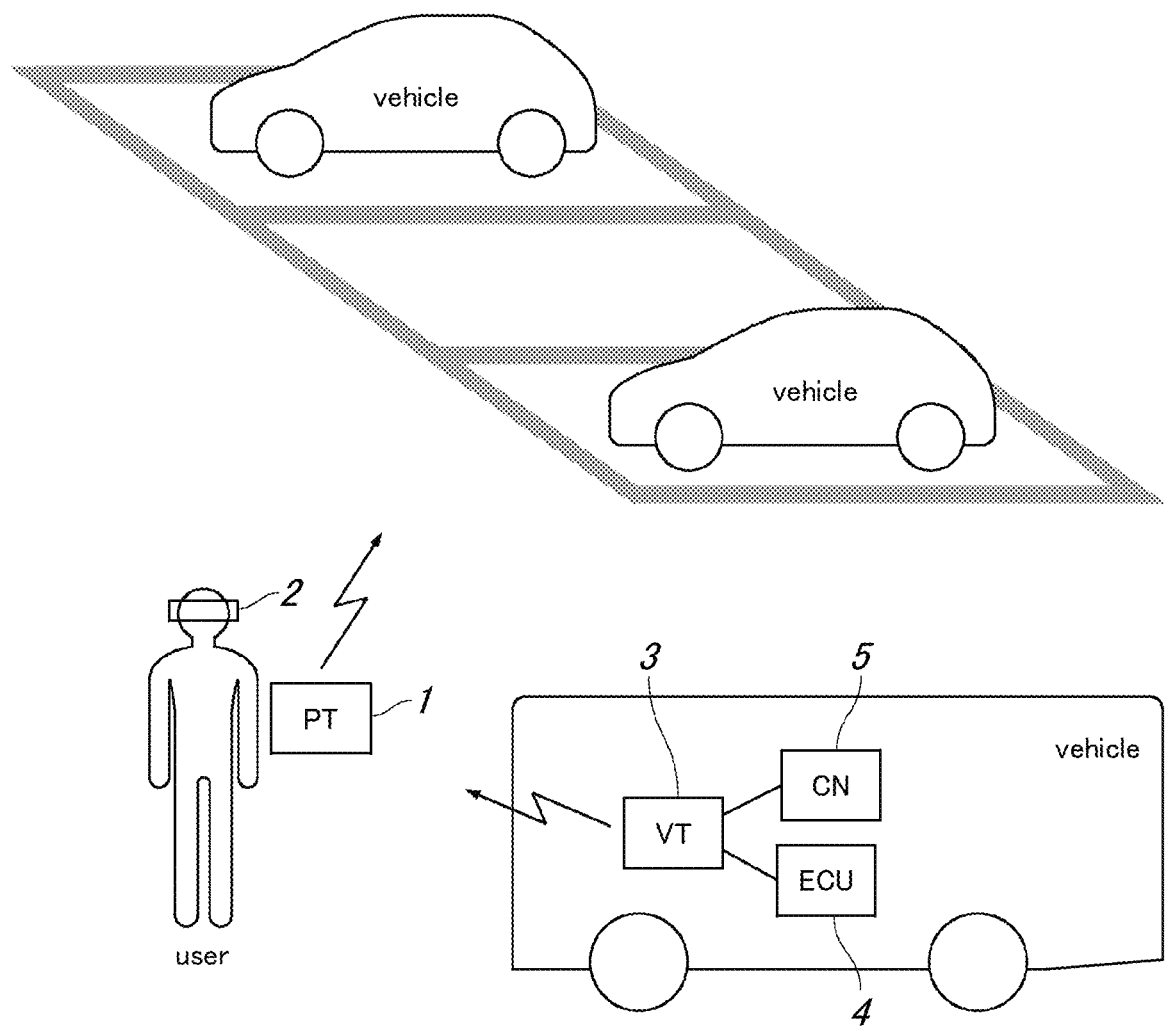
FIG. 21 is a diagram showing a general configuration of a line-of-sight-based guidance system according to a sixth embodiment of the present invention.

Next, a sixth embodiment of the present invention will be described. Except for what will be discussed here, the sixth embodiment is the same as the above-described embodiments. FIG. 21 is a diagram showing a general configuration of a line-of-sight-based guidance system according to the sixth embodiment.

In the above-described embodiments, the system is configured such that a user guides a vehicle (autonomous driving vehicle) to a parking space (designated parking location) through line-of-sight-based guidance. However, there are some possible cases where the vehicle cannot park at the designated parking space for the reason that the size of the parking space is smaller than the vehicle body size, for example. In this view, in the present embodiment, a system is configured such that an in-vehicle terminal determines whether or not the parking space designed by a user is a parking space at which the vehicle can park, and when the vehicle cannot park at the designated parking space, the in-vehicle terminal changes the designated parking space to a new parking space.

When the parking space designated by a user is not suitable for the body size of a vehicle; that is, the parking space has a smaller size than the body size of the vehicle, the in-vehicle terminal 3 determines that the vehicle cannot park at the parking space. Also, when the designated parking space is currently a parking prohibited space, the in-vehicle terminal 3 determines that the vehicle cannot park at the parking space. In addition, when another vehicle has already parked at the parking space, the in-vehicle terminal 3 determines that the vehicle cannot park at the parking space.

In the present embodiment, the in-vehicle terminal 3 determines whether or not the vehicle can park at the parking space designated by a user based on a dynamic map (integrated map information). The dynamic map is delivered from a dynamic map management server to an in-vehicle terminal 3 via a roadside device 8.

In the dynamic map, various types of information records are registered in a hierarchical manner according to the update frequency of each information record. Specifically, there are four layers of information records; that is, static information records, quasi-static information records, quasi-dynamic information records, and dynamic information records. Static information records are records that are updated at intervals of, for example, about one month, and examples of the static information records include road surface information, lane information, and information on 3D structural objects. Quasi-static information records are records that are updated at intervals of, for example, about one hour, and examples of the quasi-static information records include traffic regulation information, road construction information, and wide area weather information. Quasi-dynamic information records are records that are updated at intervals of, for example, about one minute, and examples of the quasi-dynamic information records include accident information, traffic congestion information, and small area weather information. Dynamic information records are records that are updated at intervals of, for example, about 1 second, and examples of the dynamic information records include ITS look-ahead information such as nearby vehicle information, pedestrian information, and signal information. In automatic driving (autonomous driving, driving support), the dynamic map is used to move a vehicle safely and quickly to a target location. When position data of a target location involves an error, the position data of the target location is corrected based on the dynamic map.

In the present embodiment, information as to whether or not the vehicle can park a certain location (parking suitability information records) is registered in the dynamic map as a quasi-static information record, for example. The parking suitability information records include information as to whether or not there is a parked vehicle (parking availability information), information on the size of the parking space (parking space size information), and information as to whether or not there is an applicable parking prohibition regulation (parking prohibition information).

Figure 22:
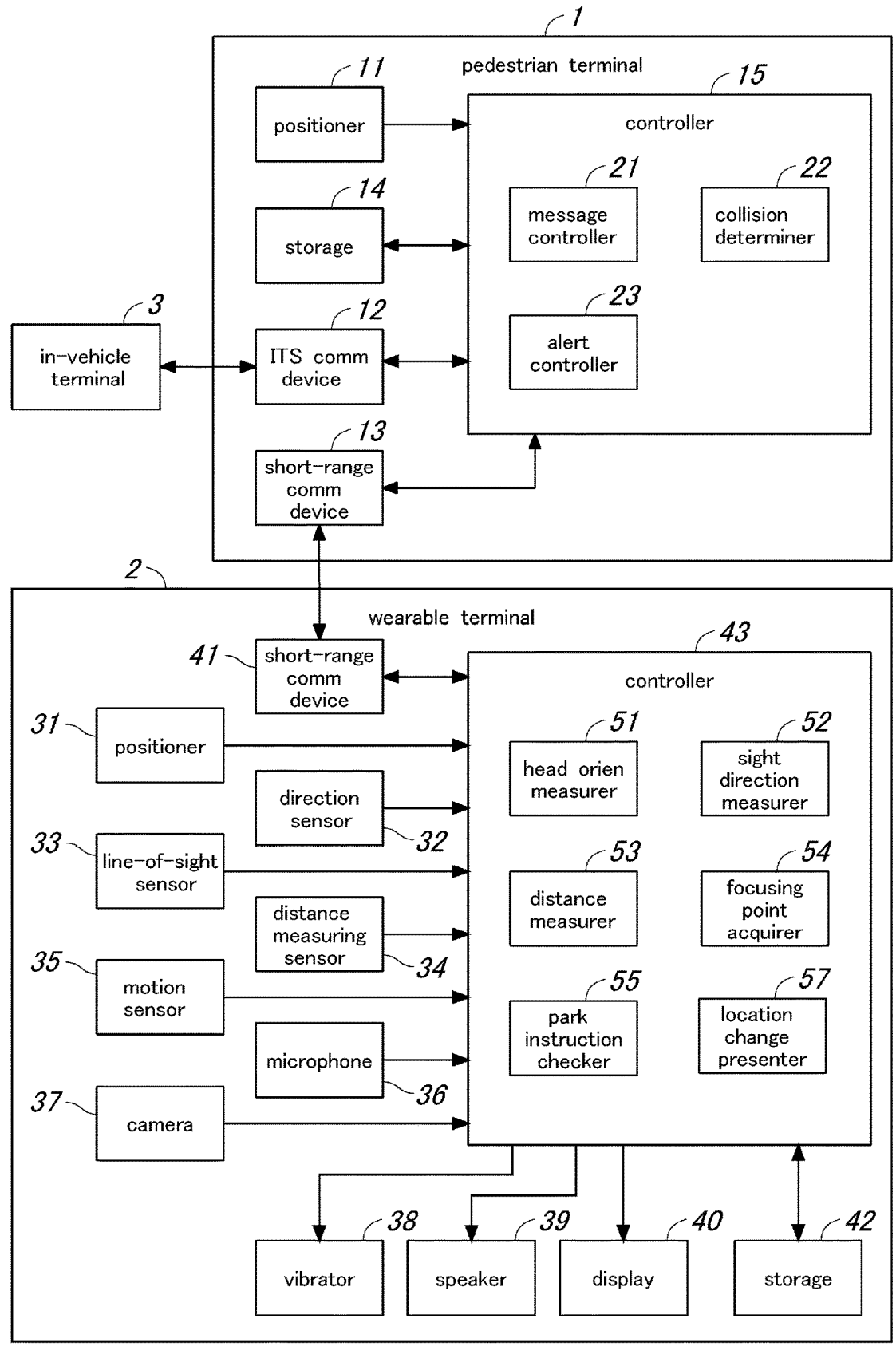
FIG. 22 is a block diagram showing a schematic configuration of a pedestrian terminal 1 and a wearable terminal 2 according to the sixth embodiment.

Next, a pedestrian terminal 1 and a wearable terminal 2 according to the sixth embodiment will be described. FIG. 22 is a block diagram showing a schematic configuration of a pedestrian terminal 1 and a wearable terminal 2.

The controller 43 of the wearable terminal 2 is the same as that of the first embodiment (See FIG. 2) except that the controller 43 further includes a location change presenter 57.

When receiving a location change message from the in-vehicle terminal 3, the location change presenter 57 controls the wearable terminal 2 so as to notify the user of the change in the parking location and a new parking location.

Figure 23:
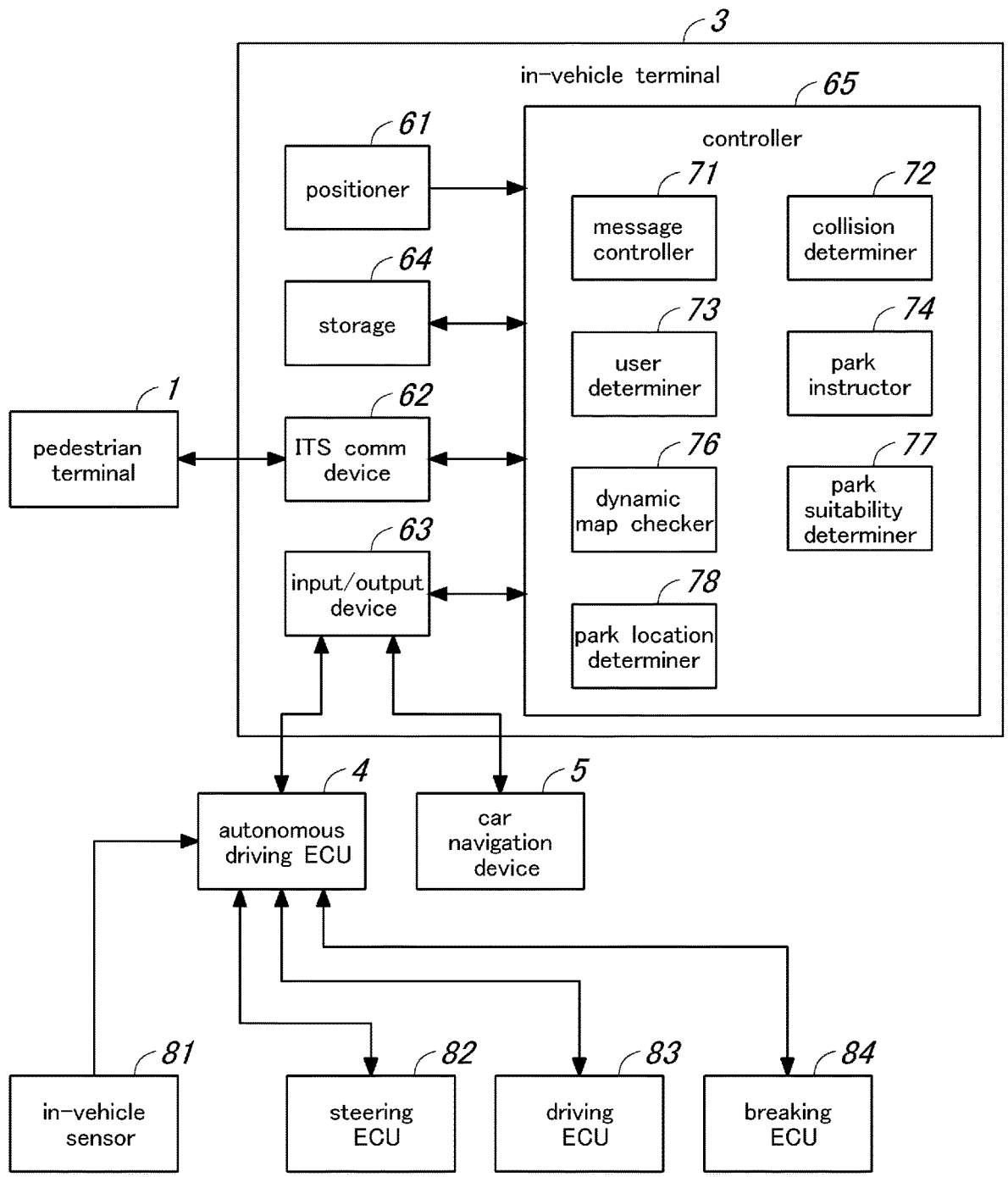
FIG. 23 is a block diagram showing a schematic configuration of an in-vehicle terminal 3 according to the sixth embodiment.

Next, a schematic configuration of an in-vehicle terminal 3 according to the sixth embodiment will be described. FIG. 23 is a block diagram showing a schematic configuration of an in-vehicle terminal 3.

The controller 65 of the in-vehicle terminal 3 is the same as that of the first embodiment (See FIG. 2) except that the controller 65 further includes a dynamic map checker 76, a park suitability determiner 77, and a park location determiner 78. The storage 64 of the in-vehicle terminal 3 stores a dynamic map.

The dynamic map checker 76 acquires parking suitability information regarding a designated parking location from the dynamic map information stored in the storage 64, based on the position data of the designated parking location included in a message received from the pedestrian terminal 1.

The park suitability determiner 77 determines whether or not the vehicle can park at a designated parking location, based on the parking suitability information regarding the designated parking location acquired by the dynamic map checker 76.

When the park suitability determiner 77 determines that the vehicle cannot park at the designated parking location, the park location determiner 78 selects a parking space at which the vehicle is to park based on a predetermined selection criterion, and changes the designated parking location to the selected parking space. When the park location determiner 78 changes the designated parking location, the message controller 71 generates a location change message (location change notification) and transmits it to the pedestrian terminal 1.

With regard to the selection criterion, the park suitability determiner 77 may select the parking space closest to the original designated parking location using the distance from the original designated parking location as a selection criterion. The park suitability determiner 77 may select a parking space which is likely to be highly convenient for the user, for example, the parking space closest to the store entrance, a shaded parking space, or the parking space that is closest to the entrance/exit of the parking lot.

Figure 24:
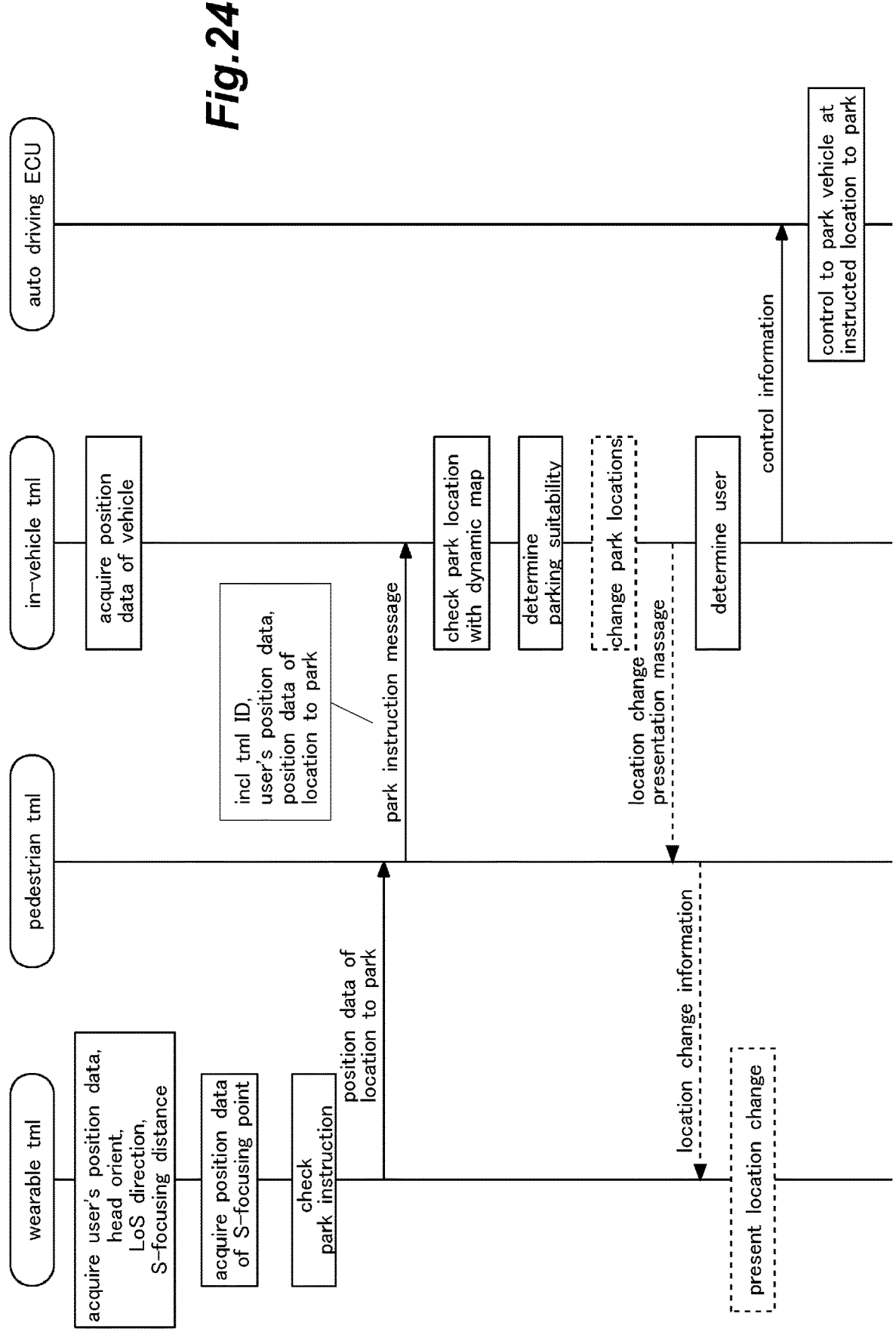
FIG. 24 is a sequence diagram showing an operation procedure of the line-of-sight-based guidance system according to the sixth embodiment.

Next, an operation procedure of the line-of-sight-based guidance system according to the sixth embodiment. FIG. 24 is a sequence diagram showing an outline of an operation procedure of the line-of-sight-based guidance system.

In the wearable terminal 2, after acquiring the user's position data, the head orientation, the line-of-sight direction, and the sight focusing distance, the focusing point acquirer 54 acquires, based on the acquired information, the position data of the sight focusing location at which the user looks, in the same manner as the first embodiment (See FIG.

5). After the park instruction checker 55 determines that the user has instructed the vehicle to park at the designated parking location (sight focusing location), the short-range communication device 41 transmits the data of the designated parking location to the pedestrian terminal 1.

In the pedestrian terminal 1, when receiving the information on the designated parking location from the wearable terminal 2, the ITS communication device 12 transmits a park instruction message to the in-vehicle terminal 3.

In the in-vehicle terminal 3, when the ITS communication device 62 receives the park instruction message from the pedestrian terminal 1, based on the position data of the designated parking location included in a message received from the pedestrian terminal 1, the dynamic map checker 76 acquires parking suitability information regarding the designated parking location from the dynamic map information stored in the storage 64.

Next, the in-vehicle terminal 3, the park suitability determiner 77 determines whether or not the vehicle can park at the designated parking location, based on the parking suitability information regarding the designated parking location acquired by the dynamic map checker 76.

Next, the in-vehicle terminal 3, when the park suitability determiner 77 determines that the vehicle can park at the designated parking location, the user determiner 73 determines whether or not the user instructing the vehicle to park is an authorized user, who is allowed to use the vehicle. The subsequent operations are the same as in the first embodiment (See FIG. 5).

When the park suitability determiner 77 determines that the vehicle can park at the designated parking location, the park location determiner 78 selects a parking space at which the vehicle is to park based on a predetermined selection criterion, and changes the designated parking location to the selected parking space.

Then, the message controller 71 of the in-vehicle terminal 3 generates a location change message and transmits it to the pedestrian terminal 1.

In the pedestrian terminal 1, when receiving the location change message from the in-vehicle terminal 3, the location change presenter 57 controls the wearable terminal 2 so as to notify the user of the change in the parking location and a new parking location.

Figure 25:
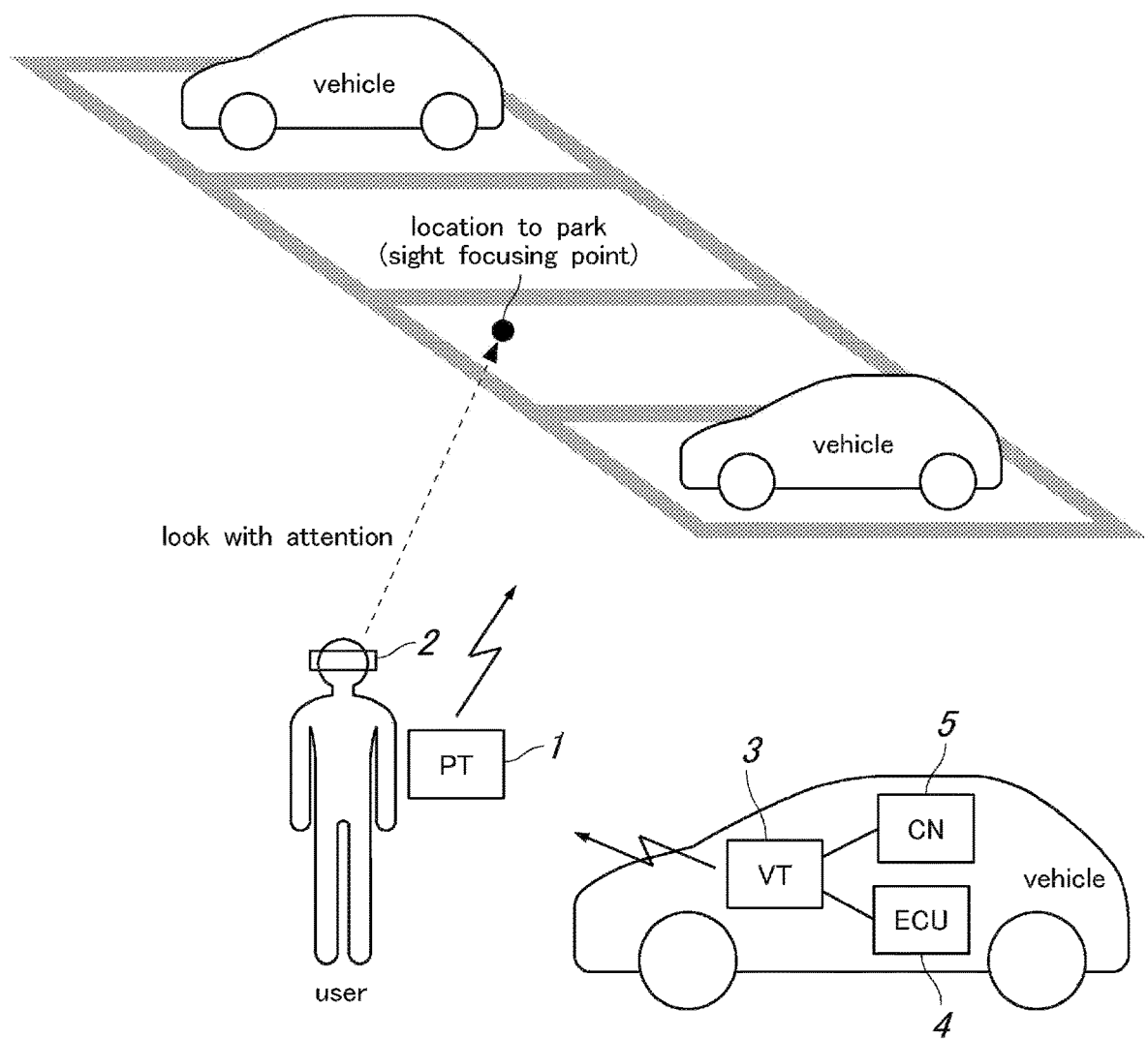
FIG. 25 is an explanatory diagram showing an outline of operations performed by a park location determiner 78 of the in-vehicle terminal 3 according to the sixth embodiment.
Figure 26:
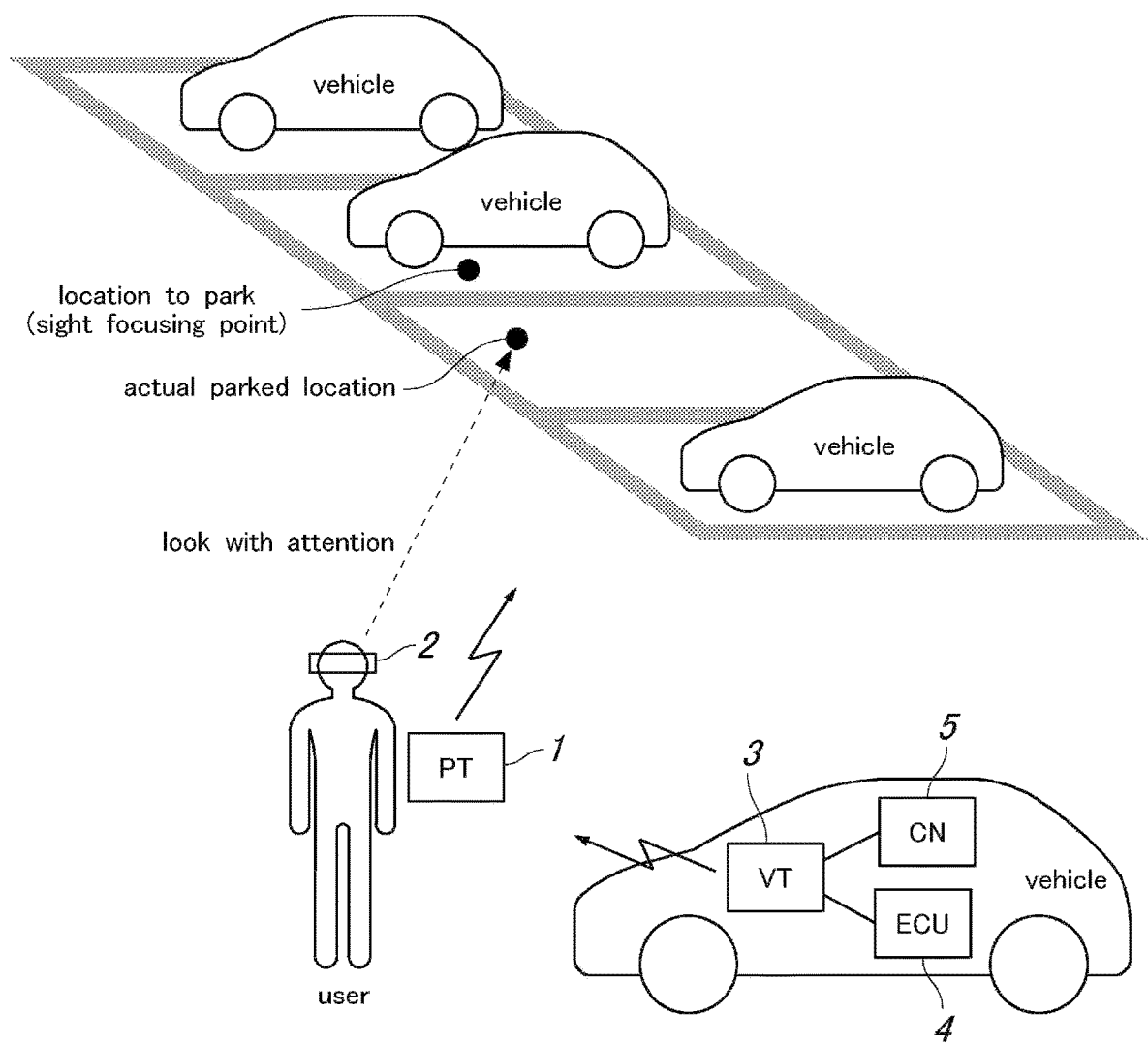
FIG. 26 is an explanatory diagram showing an outline of operations performed by a park location determiner 78 of the in-vehicle terminal 3 according to the sixth embodiment.

Next, operations performed by the park location determiner 78 of the in-vehicle terminal 3 will be described. FIGS. 25 and 26 are explanatory diagrams showing an outline of operations performed by the park location determiner 78 of the in-vehicle terminal 3.

When the park suitability determiner 77 determines that the vehicle cannot park at the designated parking location, the park location determiner 78 selects a parking space at which the vehicle is to park based on a predetermined selection criterion, and changes the designated parking location to the selected parking space. Moreover, when the in-vehicle terminal cannot determine one parking space at which the vehicle can park as the designated parking location, the park location determiner 78 performs the following control operations.

In the example shown in FIG. 25, there are a plurality of parking spaces in the same direction when viewed from the user. In this case, there can be two or more parking spaces which correspond to the parking location designated by the user and at which the vehicle can park. In such a case, the park location determiner 78 in the in-vehicle terminal 3 determines one of the parking spaces as the designated parking location based on a predetermined selection criterion.

For example, the park location determiner 78 may determine the parking space closest to the user as a target location.

In the example shown in FIG. 26, in some cases, an incorrect parking location is designated because of a positioning error. For example, in some cases, a parking space corresponding to the parking location designated by the user is not available because of another parked vehicle and one or more parking spaces next to the designated parking location are available. In such cases, the park location determiner 78 in the in-vehicle terminal 3 selects one empty parking space based on the predetermined selection criterion and determines it as a designated parking location.

For example, the park location determiner 78 may select, from empty parking spaces around the parking space designated by the user, one parking space closest to that parking space as a designed parking location (target location).

Seventh Embodiment

Next, a seventh embodiment of the present invention will be described. Except for what will be discussed here, the seventh embodiment is the same as the above-described embodiments.

In the above-described embodiments, the in-vehicle terminal is configured to select a parking space at which the vehicle is to park based on a predetermined selection criterion, and changes the designated parking location to the selected parking space. However, in some cases, the parking space selected in this way can be one which is not suitable for parking. In this view, in the present embodiment, an in-vehicle terminal is configured to select a new designated parking location based on a predetermined selection criterion, and present the new designated parking location to a user as a candidate location. Then, when the user approves the candidate location, the in-vehicle changes the designated parking location to the candidate location. Furthermore, when there are two or more candidate locations that meet the selection criterion, the in-vehicle terminal indicates the two or more candidate locations to the user so as to urge the user to select one of the candidate locations. In addition, when the user does not approve any candidate location, the in-vehicle terminal urges the user to designate a parking location utilizing the user's line of sight.

Figure 27:
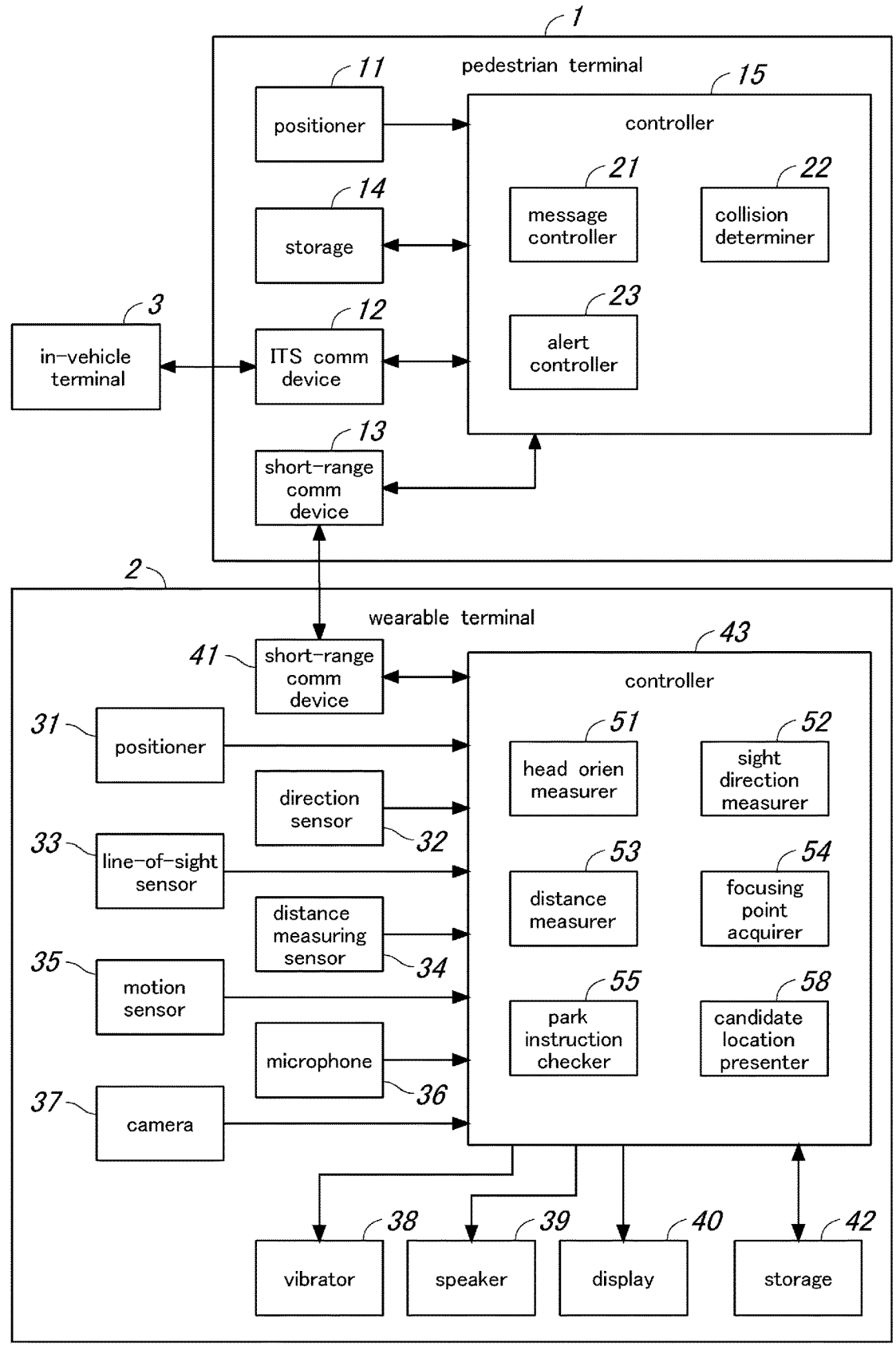
FIG. 27 is a block diagram showing a schematic configuration of a pedestrian terminal 1 and a wearable terminal 2 according to a seventh embodiment of the present invention.

Next, a schematic configuration of a pedestrian terminal 1 and a wearable terminal 2 according to the seventh embodiment will be described. FIG. 27 is a block diagram showing a schematic configuration of a pedestrian terminal 1 and a wearable terminal 2.

The controller 43 of the wearable terminal 2 is the same as that of the first embodiment (See FIG. 2) except that the controller 43 further includes a candidate location presenter 58.

When receiving a location change message from the in-vehicle terminal 3, the candidate location presenter 58 controls the wearable terminal 2 so as to perform an operation of presenting to the user a notification that the parking location has been changed along with the position of the new parking point. In addition, the candidate location presenter 58 acquires the user's indication of approval or selection regarding the candidate location (candidate approval selection information) based on an action taken by the user.

The configuration of the in-vehicle terminal 3 according to the present embodiment is the same as that of the sixth embodiment (See FIG. 23).

When the park suitability determiner 77 determines that the vehicle cannot park at the designated parking location, the park location determiner 78 selects a parking space at which the vehicle can park as a candidate location, based on a predetermined selection criterion, and presents the candidate location to the user. Then, when the user approves the candidate location, the park location determiner 78 changes the parking location to the candidate location.

Figure 28:
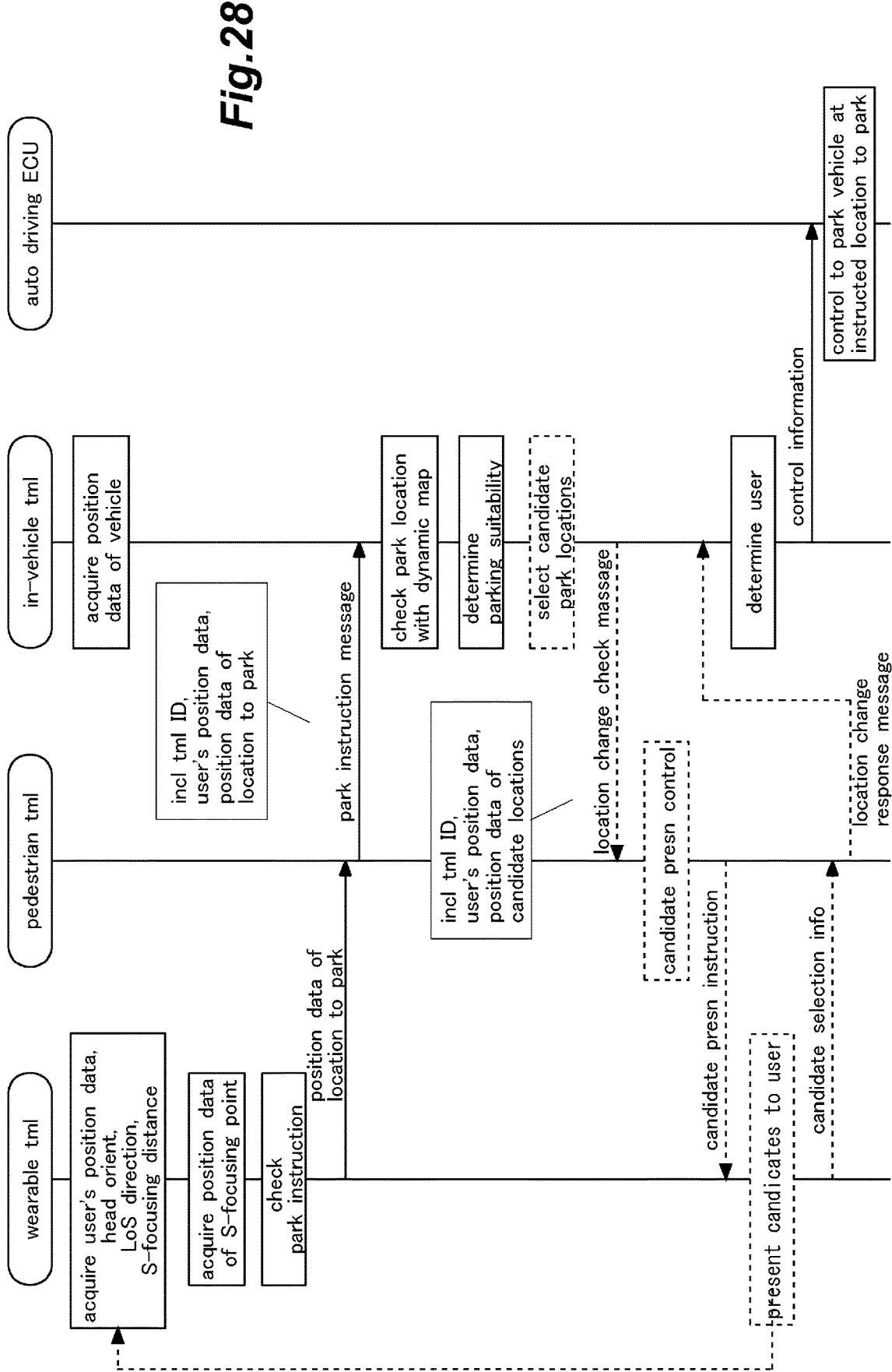
FIG. 28 is a sequence diagram showing an operation procedure of a line-of-sight-based guidance system according to the seventh embodiment.

Next, an operation procedure of the line-of-sight-based guidance system according to the seventh embodiment will be described. FIG. 28 is a sequence diagram showing an operation procedure of the line-of-sight-based guidance system.

In the wearable terminal 2, after acquiring the user's position data, the head orientation, the line-of-sight direction, and the sight focusing distance, based on these acquired data, the focusing point acquirer 54 acquires the position data of the sight focusing location at which the user looks, in the same manner as the first embodiment (See FIG. 5). After the park instruction checker 55 determines that the user has instructed the vehicle to park at the designated parking location (sight focusing location), the short-range communication device 41 transmits the data of the designated parking location to the pedestrian terminal 1.

In the pedestrian terminal 1, when receiving the position data of the designated parking location from the wearable terminal 2, the ITS communication device 12 transmits a park instruction message to the in-vehicle terminal 3.

In the in-vehicle terminal 3, when the ITS communication device 62 receives the park instruction message from the pedestrian terminal 1, based on the position data of the designated parking location included in a message received from the pedestrian terminal 1, the dynamic map checker 76 acquires parking suitability information regarding the designated parking location from the dynamic map information stored in the storage 64.

Next, the in-vehicle terminal 3, the park suitability determiner 77 determines whether or not the vehicle can park at the designated parking location, based on the parking suitability information regarding the designated parking location acquired by the dynamic map checker 76.

Next, the in-vehicle terminal 3, when the park suitability determiner 77 determines that the vehicle can park at the designated parking location, the park location determiner 78 selects a parking space at which the vehicle is to park as a candidate location based on a predetermined selection criterion. For example, the park location determiner 78 may select the parking space closest to the original designated parking location as a candidate location.

Then, the message controller 71 of the in-vehicle terminal 3 generates a location change presentation massage and transmits it to the pedestrian terminal 1. The message includes the terminal ID of the destination pedestrian terminal 1, the terminal ID of the source in-vehicle terminal 3, and candidate location information.

When receiving the location change presentation massage from the in-vehicle terminal 3, the pedestrian terminal 1 controls the wearable terminal 2 so as to perform a candidate presentation operation for presenting one or more candidate locations notified by the message to the user. The pedestrian terminal 1 controls the wearable terminal 2 such that, when there is only one candidate location, the wearable terminal 2 asks the user if the user approves the location change, and when there are two or more candidate locations, the wearable terminal 2 urges the user to select one of the two or more candidate locations, or approve no candidate location.

When the user does not approve any candidate location, the process returns to the step in which the user designates a parking location utilizing the user's line-of-sight so that the wearable terminal 2 acquires the user's position data, the head orientation, the line-of-sight direction, and the sight focusing distance. When the user approves the presented one candidate location or selects one of the two or more candidate locations, the wearable terminal 2 transmits a location change response message to the in-vehicle terminal 3. The location change response message includes the terminal ID of the destination in-vehicle terminal 3, the terminal ID of the source pedestrian terminal 1, and information on the candidate location approved or selected by the user.

In the in-vehicle terminal 3, when receiving the location change response message, the user determiner 73 determines whether or not the user instructing the vehicle to park is an authorized user, who is allowed to use the vehicle. The subsequent operations are the same as in the first embodiment (See FIG. 5).

Eighth Embodiment

Figure 29:
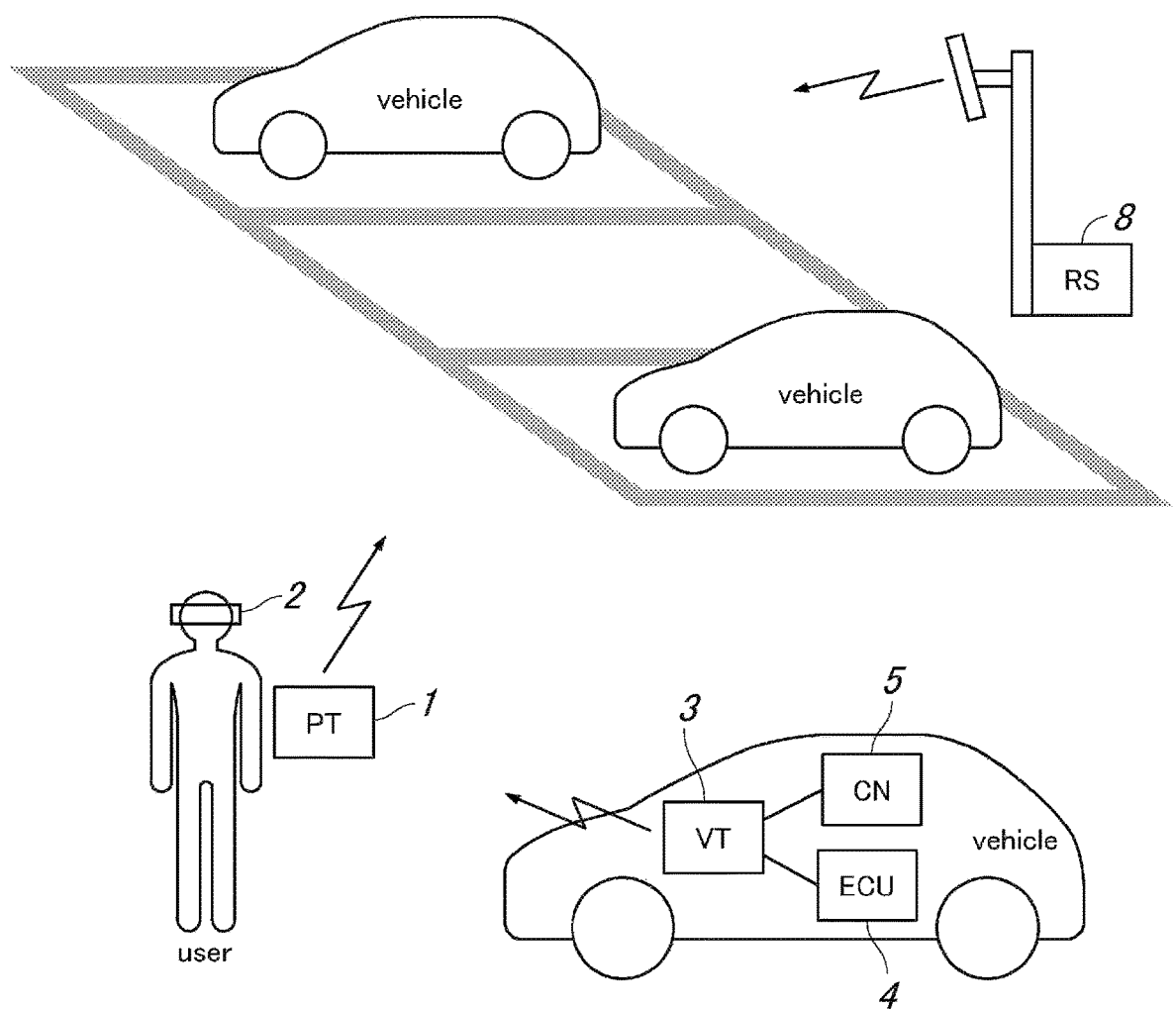
FIG. 29 is a diagram showing a general configuration of a line-of-sight-based guidance system according to an eighth embodiment of the present invention.

Next, an eighth embodiment of the present invention will be described. Except for what will be discussed here, the eighth embodiment is the same as the above-described embodiments. FIG. 29 is a diagram showing a general configuration of a line-of-sight-based guidance system according to the eighth embodiment.

In the sixth embodiment, the in-vehicle terminal 3 determines whether or not the vehicle can park at the parking location designed by a user, based on the dynamic map provided from the management server. In the present embodiment, the in-vehicle terminal 3 determines whether or not the vehicle can park at the parking location designated by a user, based on information collected by a roadside device 8 (RD) equipped with a radar, (what is called an infrastructure radar).

Figure 30:
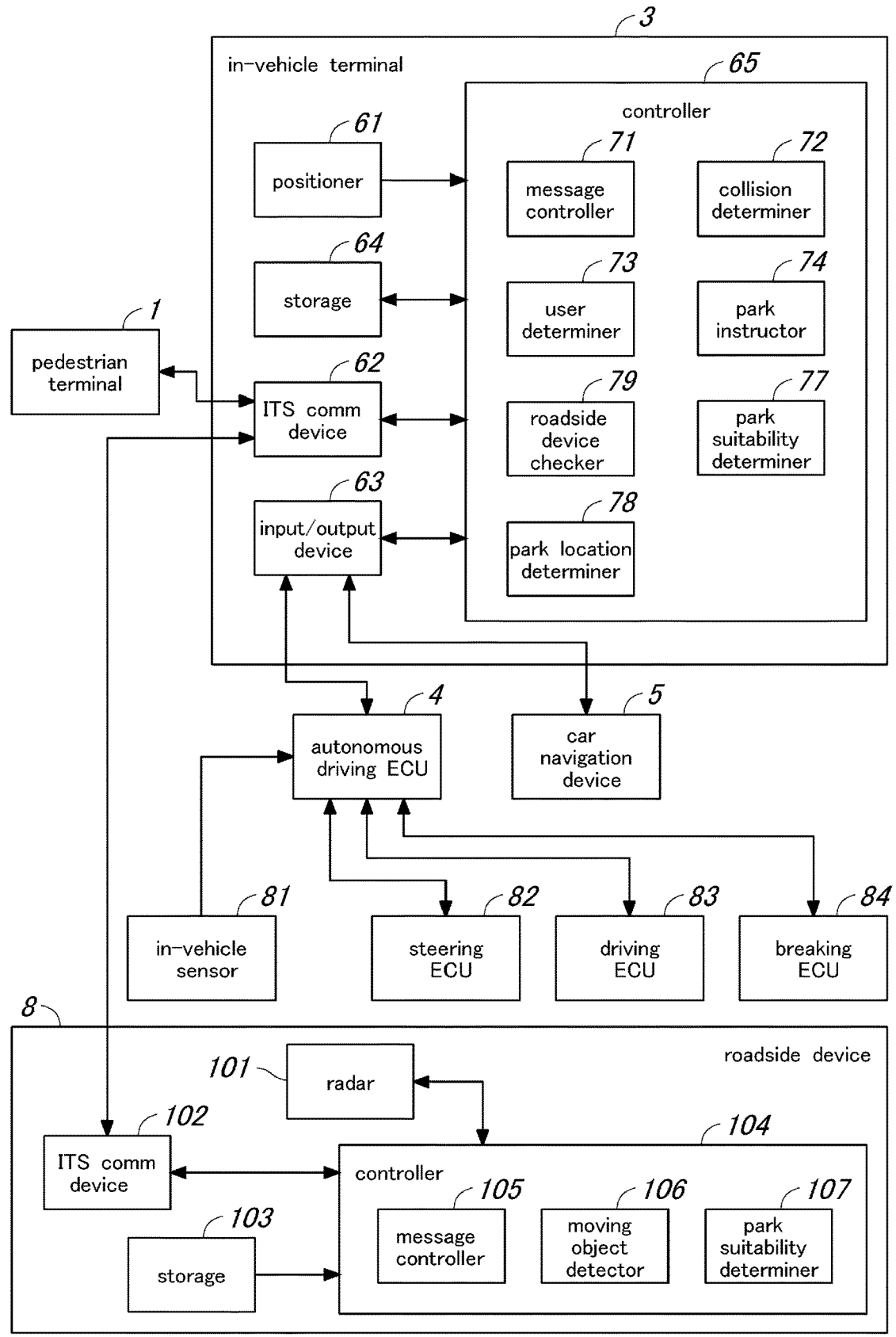
FIG. 30 is a block diagram showing a schematic configuration of an in-vehicle terminal 3 and a roadside device 8 according to the eighth embodiment.

Next, a schematic configuration of an in-vehicle terminal 3 and a roadside device 8 according to the eighth embodiment will be described. FIG. 30 is a block diagram showing a schematic configuration of an in-vehicle terminal 3 and a roadside device 8.

The controller 65 of the in-vehicle terminal 3 is the same as that of the sixth embodiment (See FIG. 23) except that the controller 65 further includes a roadside device checker 79.

The roadside device checker 79 asks the roadside device 8 for the parking suitability at the parking location, thereby acquiring information as to whether or not the vehicle can park at the parking location (parking suitability information).

The configuration of a pedestrian terminal 1 and a wearable terminal 2 is the same as that of the sixth embodiment (see FIG. 22).

The roadside device 8 includes a radar 101 (object detector), an ITS communication device 102 (roadside-to-vehicle communications), a storage 103, and a controller 104.

The radar 101 emits radio waves, and receives radar reflection waves to detect an object (including a pedestrian and a mobile body such as a vehicle) located around the radar, thereby measuring the direction toward the object and the distance to the object. The radar 101 is not limited to a certain type of radar and may be a millimetric wave radar or a laser radar.

The ITS communication device 102 transmits and receives messages to and from the in-vehicle terminal 3 through ITS communications (roadside-to-vehicle communications).

The storage 103 stores map information, position data of the roadside device 8, programs executable by a processor which implements the controller 104, and other information.

The controller 104 includes a message controller 21, a moving object detector 106, and a park suitability determiner 107. The controller 104 is configured by the processor, and each unit of the controller 104 is implemented by the processor executing a program stored in the storage 103.

The message controller 105 controls the transmission of messages to the in-vehicle terminal 3.

The moving object detector 106 detects moving objects (pedestrians and vehicles) on the road located near the roadside device based on the detection result of the radar 101.

The park suitability determiner 107 determines whether or not the vehicle can park at each location based on the detection result of the moving object detector 106 and the map information stored in the storage 103, and acquires information on the determination results. (parking suitability information). The parking suitability information includes information on whether or not there is a parked vehicle (parking availability information) and information on the size of each parking space (parking space size information).

The roadside device 8 delivers various types of information such as traffic information to the pedestrian terminal 1 and the in-vehicle terminal 3. Although, in the present embodiment, the radar 101 is used to detect an object on the road (including a moving object such as a pedestrian or a vehicle) to thereby acquire the position data of the object, the moving object detector for detecting objects on the road is not limited to the radar, and may be a stereo camera, for example. In this case, the roadside device can detect objects on the road from images taken by the stereo camera.

Next, an operation procedure of a line-of-sight-based guidance system according to the eighth embodiment will be described. FIG. 31 is a sequence diagram showing an operation procedure of the line-of-sight-based guidance system.

In the wearable terminal 2, after acquiring the user's position data, the head orientation, the line-of-sight direction, and the sight focusing distance, the focusing point acquirer 54 acquires, based on the acquired information, the position data of the sight focusing location at which the user looks, in the same manner as the first embodiment (See FIG. 5). After the park instruction checker 55 determines that the user has instructed the vehicle to park at the designated parking location (sight focusing location), the short-range communication device 41 transmits the data of the designated parking location to the pedestrian terminal 1.

In the pedestrian terminal 1, when receiving the information on the designated parking location from the wearable terminal 2, the ITS communication device 12 transmits a park instruction message to the in-vehicle terminal 3. The park instruction message includes the terminal ID of the pedestrian terminal 1 which is the source of message, the user's position data (latitude, longitude) and head orientation data, and the position data (latitude, longitude) of the parking location.

In the in-vehicle terminal 3, when the ITS communication device 62 receives the park instruction message from the pedestrian terminal 1, the roadside device checker 79 asks the roadside device 8 for the parking suitability at the parking location, thereby acquiring information as to whether or not the vehicle can park at the parking location (parking suitability information). In this operation, the message controller 71 causes the ITS communication device 62 to transmit a parking suitability check message to the roadside device 8. The message includes the terminal ID of the source in-vehicle terminal 3 and the position data (latitude, longitude) of the parking location.

In the roadside device 8, when the ITS communication device 102 receives the parking suitability check message from the in-vehicle terminal 3, the park suitability determiner 107 determines whether or not the vehicle can park at the parking location, thereby acquiring parking suitability information.

Next, in the roadside device 8, the message controller 105 generates a response message, and then the ITS communication device 102 transmits the response message to the in-vehicle terminal 3. The response message includes the parking suitability information (parking availability information, parking space size information).

In the in-vehicle terminal 3, when the ITS communication device 62 receives the response message from the roadside device 8, the roadside device checker 79 acquires the parking suitability information included in the message. Then, the park suitability determiner 77 determines whether or not the vehicle can park at the designated parking location, based on the parking suitability information. The subsequent operations are the same as in the sixth embodiment (See FIG. 24).

Specific embodiments of the present invention are described herein for illustrative purposes. However, the present invention is not limited to those specific embodiments, and various changes, substitutions, additions, and omissions may be made for elements of the embodiments without departing from the scope of the invention. In addition, elements and features of the different embodiments may be combined with each other to yield an embodiment which is within the scope of the present invention.

In the present embodiments, the present invention has been described with reference mainly to embodiments in which a car is used as a vehicle. However, the present invention is applicable to any type of vehicle such as a motorcycle, an electric wheelchair, or a mobility scooter in the same manner.

INDUSTRIAL APPLICABILITY

A pedestrian device, an in-vehicle device, a mobile body guidance system, and a mobile body guidance method according to the present invention can guide a mobile body with autonomous movement capability to a proper location through line-of-sight-based guidance utilizing a line-of-sight of a user, in particular, the devices, the system and the method according to the present invention can minimize costs for implementation by using devices included in an existing safe driving assistance wireless system, and are useful as a pedestrian device carried by a pedestrian, an in-vehicle device mounted in a vehicle, and a mobile body guidance system and a mobile body guidance method for guiding a mobile body with autonomous movement capability in response to an action taken by a user.

Glossary 1 pedestrian terminal (pedestrian device)
2 wearable terminal (wearable device)
3 in-vehicle terminal (terminal device, in-vehicle device)
4 autonomous driving ECU (mobile controller, cruise controller)
5 car navigation device (route guidance device)
6 in-drone terminal (terminal device)
7 light control device (mobile controller, flight controller)
8 roadside device (RD)
11 positioner
12 ITS communication device 13 short-range communication device
14 storage
15 controller
31 positioner
32 direction sensor
33 line-of-sight sensor
34 distance measuring sensor
35 motion sensor
36 microphone
37 camera
38 vibrator
39 speaker
40 display
41 short-range communication device
42 storage
43 controller
61 positioner
62 ITS communication device
63 input/output device
64 storage
65 controller

The invention claimed is:

1. A pedestrian device carried by a pedestrian who is a user of a mobile body with autonomous movement capability, the device comprising:
   a communication device configured to transmit and receive information to and from a terminal device mounted in the mobile body;
   a short-range communication device configured to perform short-range communications with a wearable device; and
   a controller configured to determine if there is a risk of collision between the mobile body and the pedestrian based on the information received from the terminal device, and when necessary, perform control so as to provide an alert to the pedestrian,
   wherein the controller is configured to:
      acquire position data of a sight focusing location at which the user looks with attention, as position data of a target location; and
      cause the communication device to transmit the position data of the target location to the terminal device mounted in the mobile body used by the user, thereby causing the terminal device to perform control so as to move the mobile body to the target location;
   wherein the wearable device is configured to be worn on the user's body and detect a sight focusing status of the user, and
   wherein the controller acquires the position data of the sight focusing location from the wearable device.

2. The pedestrian device according to claim 1, wherein the controller is configured to:
   acquire the position data of the sight focusing location as position data of a designated parking location; and
   cause the communication device to transmit the position data of the designated parking location to the terminal device mounted in the mobile body, the mobile body being an autonomous vehicle, thereby causing the terminal device to perform control so as to park the autonomous vehicle at the designated parking location.

3. The pedestrian device according to claim 1, wherein the controller is configured to:
   determine whether or not the user is riding in the mobile body; and
   when the user is riding in the mobile body, acquire position data of the mobile body transmitted from the terminal device as position data of the user.

4. The pedestrian device according to claim 1, wherein the controller is configured to:
   acquire 2D position data of the target location based on 3D measurement data of a sight focusing point at which the user looks with attention; and
   cause the communication device to transmit the 2D position data of the target location to the terminal device, thereby causing the terminal device to perform control so as to move the mobile body to the target location.

5. The pedestrian device according to claim 1, wherein the communication device is configured to communicate with a different pedestrian device, and
   wherein the controller is configured to:
      receive position data of a target location transmitted from the different pedestrian device;
      when the target location from the different pedestrian device matches the target location of the pedestrian device, determine whether or not the pedestrian device has a lower priority than the different pedestrian device; and
      when the priority of the pedestrian device is lower than that of the different pedestrian device, perform control so as to guide the user to change the target location.

6. The pedestrian device according to claim 1, wherein the controller is configured to:
   acquire 3D position data of a sight focusing point at which the user looks with attention, as 3D position data of a target point; and
   cause the communication device to transmit the 3D position data of the target point to the terminal device mounted in the mobile body which has autonomous flight capability, thereby causing the terminal device to perform control so as to move the mobile body to the target point.

7. The pedestrian device according to claim 2, wherein, when the terminal device finds no parking space at which the vehicle can park in the designated parking location, the terminal device selects a new designated parking location and transmits a location change notification regarding the new designated paring location, and
   wherein, when the pedestrian device receives the location change notification from the terminal device, the controller presents the new designated parking location to the user.

8. The pedestrian device according to claim 7, wherein, when the controller presents the new designated parking location to the user and the user takes an action in response, the controller acquires, based on the action taken by the user, information on the user's indication of approval or selection regarding the new designated parking location.

9. An in-vehicle device mounted in a vehicle with autonomous movement capability, the device comprising:
   a communication device configured to transmit and receive information to and from a pedestrian device carried by a user; and
   a controller configured to determine if there is a risk of collision between the vehicle and the user based on the information received from the pedestrian device, and when necessary, causes a cruise controller to perform cruise control so as to avoid the collision,
   wherein, when the in-vehicle device receives position data of a sight focusing location at which the user looks with attention as position data of a target location transmitted from the pedestrian device, the controller causes the cruise controller to perform control so as to move the vehicle to the target location based on the position data of the target location, wherein, when the in-vehicle device receives position data of a designated parking location which is the target location, the controller performs control so as to park the vehicle at the designated parking location based on the position data of the designated parking location, wherein the communication device communicates with a roadside device, the roadside device being provided with an object detector configured to detect a mobile body on a road, and wherein, based on parking suitability information received from the roadside device, the controller determines whether or not the vehicle can park at the designated parking location.

10. The in-vehicle device according to claim 9, wherein, when there are two or more parking spaces which correspond to the designated parking location and at which the vehicle can park, the controller determines one of the parking spaces as a designated parking location, based on a predetermined selection criterion.

11. The in-vehicle device according to claim 9, wherein, when there is no parking space which corresponds to the designated parking location and at which the vehicle can park, the controller determines one parking space at which the vehicle can park as a designated parking location, based on a predetermined selection criterion.

12. The in-vehicle device according to claim 9, wherein, when there is no parking space which corresponds to the designated parking location and at which the vehicle can park, the controller selects one parking space at which the vehicle can park as a new designated parking location, based on a predetermined selection criterion, and transmits a location change notification regarding the new designated parking location to the pedestrian device.

13. A mobile body guidance system for guiding a mobile body with autonomous movement capability in response to an action taken by a user, the system comprising:
 a pedestrian device carried by a pedestrian who is the user of the mobile body; and
 a terminal device mounted in the mobile body,
 wherein the pedestrian device comprises:
  a communication device configured to transmit and receive information to and from the terminal device; and
  a controller configured to determine if there is a risk of collision between the mobile body and the pedestrian based on the information received from the terminal device, and when necessary, perform control so as to provide an alert to the pedestrian,
 wherein the controller of the pedestrian device is configured to:
 acquire position data of a sight focusing location at which the user looks with attention, as position data of a target location; and
 cause the communication device of the pedestrian device to transmit the position data of the target location to the terminal device mounted in the mobile body used by the user,
 wherein the terminal device comprises:
  a communication device configured to transmit and receive information to and from the pedestrian device; and
  a controller configured to determine if there is a risk of collision between the mobile body and the user based on the information received from the pedestrian device, thereby causing a mobile controller to perform cruise control so as to avoid the collision,
 wherein, when receiving the position data of the target location from the pedestrian device, the controller of the terminal device causes the mobile controller to perform control so as to move the mobile body to the target location based on the position data of the target location.

14. A mobile body guidance method for guiding a mobile body with autonomous movement capability in response to an action taken by a user,
 wherein a pedestrian device is carried by a pedestrian who is the user of the mobile body,
 wherein a terminal device mounted in the mobile body,
 wherein the pedestrian device is configured to transmit and receive information to and from the terminal device, determine if there is a risk of collision between the mobile body and the pedestrian based on the information received from the terminal device, and when necessary, provide an alert to the pedestrian,
 wherein the terminal device is configured to transmit and receive information to and from the pedestrian device, determine if there is a risk of collision between the mobile body and the user based on the information received from the pedestrian device, and when necessary, causes a mobile controller to perform control so as to avoid the collision,
 wherein the method comprises:
 the pedestrian device acquiring position data of a sight focusing location at which the user looks with attention as position data of a target location;
 the pedestrian device transmitting the position data of the target location to the terminal device; and
 when receiving the position data of the target location from the pedestrian device, the terminal device causing the mobile controller to perform control so as to move the mobile body to the target location based on the position data of the target location.

* * * * *